US008208090B2

(12) United States Patent
Lee

(10) Patent No.: US 8,208,090 B2
(45) Date of Patent: Jun. 26, 2012

(54) LIQUID CRYSTAL DISPLAY DEVICE AND METHOD OF ASSEMBLING THE SAME

(75) Inventor: Sang-Duk Lee, Asan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 377 days.

(21) Appl. No.: 12/483,393

(22) Filed: Jun. 12, 2009

(65) Prior Publication Data

US 2010/0118225 A1    May 13, 2010

(30) Foreign Application Priority Data

Nov. 13, 2008  (KR) ........................ 10-2008-0112832

(51) Int. Cl.
G02F 1/1333    (2006.01)
(52) U.S. Cl. ............................................. 349/58; 349/56
(58) Field of Classification Search .................... 349/58, 349/56
See application file for complete search history.

(56) References Cited

U.S. PATENT DOCUMENTS

| | | | | |
|---|---|---|---|---|
| 5,526,227 | A * | 6/1996 | Satou et al. | 361/679.32 |
| 7,695,178 | B2 * | 4/2010 | Suh et al. | 362/612 |
| 7,714,952 | B2 * | 5/2010 | Chang | 349/58 |
| 7,724,317 | B2 * | 5/2010 | Kim et al. | 349/58 |
| 7,787,070 | B2 * | 8/2010 | Choi et al. | 349/58 |
| 7,810,943 | B2 * | 10/2010 | Ko et al. | 362/97.2 |
| 7,824,050 | B2 * | 11/2010 | Tsai et al. | 362/97.4 |
| 7,924,389 | B2 * | 4/2011 | Han et al. | 349/150 |
| 2002/0034064 | A1 * | 3/2002 | Kim | 361/681 |
| 2002/0186333 | A1 * | 12/2002 | Ha et al. | 349/58 |
| 2004/0008512 | A1 * | 1/2004 | Kim | 362/235 |
| 2004/0114345 | A1 * | 6/2004 | Kim et al. | 362/31 |
| 2004/0114372 | A1 * | 6/2004 | Han et al. | 362/330 |
| 2004/0263699 | A1 * | 12/2004 | Lee et al. | 349/12 |
| 2005/0243241 | A1 * | 11/2005 | Choi et al. | 349/58 |
| 2006/0050196 | A1 * | 3/2006 | Lee | 349/58 |
| 2006/0093825 | A1 * | 5/2006 | Lee et al. | 428/411.1 |
| 2006/0139919 | A1 * | 6/2006 | Choi et al. | 362/240 |
| 2006/0139959 | A1 * | 6/2006 | Bae et al. | 362/615 |
| 2006/0232996 | A1 * | 10/2006 | Kim et al. | 362/615 |
| 2006/0290836 | A1 * | 12/2006 | Chang | 349/58 |
| 2007/0127271 | A1 * | 6/2007 | Kim | 362/633 |
| 2007/0183149 | A1 * | 8/2007 | Ko et al. | 362/225 |
| 2007/0273807 | A1 * | 11/2007 | Yun | 349/58 |

(Continued)

FOREIGN PATENT DOCUMENTS

KR    1020060037752    5/2006

(Continued)

*Primary Examiner* — K. Cyrus Kianni
(74) *Attorney, Agent, or Firm* — F. Chau & Associates, LLC

(57) ABSTRACT

A liquid crystal display device and a method of assembling the same are provided. The liquid crystal display device includes a light guide film guiding light, a light source disposed on at least one side of the light guide film, a bottom receiving container including a bottom plate to receive the light source and the light guide film, bottom receiving container sidewalls formed along the boundary of the bottom plate to define a receiving space together with the bottom plate, and an intermediate receiving container including an intermediate receiving container frame formed along the bottom receiving container sidewalls and positioned within the receiving space, and intermediate receiving container fitting portions extending from the intermediate receiving container frame toward the outside of the receiving space and fittingly coupled to the bottom receiving container.

17 Claims, 25 Drawing Sheets

U.S. PATENT DOCUMENTS

| | | | |
|---|---|---|---|
| 2008/0018826 A1* | 1/2008 | Bae et al. | 349/58 |
| 2008/0117361 A1* | 5/2008 | Chun et al. | 349/65 |
| 2008/0129918 A1* | 6/2008 | Kim et al. | 349/58 |
| 2008/0180621 A1* | 7/2008 | Woo et al. | 349/138 |
| 2008/0231776 A1* | 9/2008 | Shin et al. | 349/69 |
| 2008/0266482 A1* | 10/2008 | Ryu | 349/58 |
| 2008/0303978 A1* | 12/2008 | Han et al. | 349/64 |
| 2009/0002601 A1* | 1/2009 | Lee et al. | 349/65 |
| 2009/0040772 A1* | 2/2009 | Laney | 362/353 |
| 2009/0128731 A1* | 5/2009 | Kwon et al. | 349/58 |
| 2009/0135329 A1* | 5/2009 | Kim | 349/58 |
| 2009/0141210 A1* | 6/2009 | Cho et al. | 349/64 |
| 2009/0153766 A1* | 6/2009 | Lee et al. | 349/58 |
| 2009/0190059 A1* | 7/2009 | Ra | 349/58 |
| 2011/0002113 A1* | 1/2011 | Kim et al. | 362/97.2 |
| 2011/0149557 A1* | 6/2011 | Chung et al. | 362/97.2 |

FOREIGN PATENT DOCUMENTS

| | | |
|---|---|---|
| KR | 1020060076443 | 7/2006 |
| KR | 1020080011983 | 2/2008 |
| KR | 1020080061053 | 7/2008 |

* cited by examiner

LIQUID CRYSTAL DISPLAY DEVICE AND METHOD OF ASSEMBLING THE SAME

CROSS-REFERENCE TO RELATED APPLICATION

This application claims priority from Korean Patent Application No. 10-2008-0112832 filed on Nov. 13, 2008 in the Korean Intellectual Property Office, the disclosure of which is incorporated herein by reference in its entirety.

BACKGROUND OF THE INVENTION

1. Technical Field

The present invention relates to a liquid crystal display device and a method of assembling the same, and more particularly, to a liquid crystal display device having a reduced thickness and including components securely engaged with one another, and a method of assembling the same.

2. Discussion of the Related Art

Currently, a liquid crystal display (LCD) device is a widely used flat panel display. The LCD device includes two substrates on which field-generating electrodes are formed, and a liquid crystal layer that is interposed between the substrates. In the LCD device, a voltage is applied to the electrodes to rearrange the liquid crystal molecules of the liquid crystal layer, thereby controlling the quantity of transmitted light.

The LCD device is not a self-emitting device. Hence, it may require a backlight assembly to irradiate light to a liquid crystal panel.

The backlight assembly may include a light source, a light guide film, a plurality of optical sheets, a reflecting sheet, and lower and intermediate receiving containers which are engaged with each other.

Due to an increased demand for a backlight assembly having a reduced thickness, there is less space for coupling means, such as hooks, so that the components of a backlight assembly may not be securely coupled to each other.

Accordingly, there exists a need for a backlight assembly having components securely coupled to each other that is assembled in less time, while reducing a thickness of the backlight assembly.

SUMMARY OF THE INVENTION

Embodiments of the present invention provide a liquid crystal display (LCD) device having components securely coupled to each other that is assembled in a shortened time, and a method of assembling the LCD device.

According to an aspect of the present invention, there is provided a liquid crystal display (LCD) device including a light guide film guiding light, a light source disposed on at least one side of the light guide film, a bottom receiving container including a bottom plate to receive the light source and the light guide film, bottom receiving container sidewalls formed along the boundary of the bottom plate to define a receiving space together with the bottom plate, and an intermediate receiving container including an intermediate receiving container frame formed along the bottom receiving container sidewalls and positioned within the receiving space, and intermediate receiving container fitting portions extending from the intermediate receiving container frame toward the outside of the receiving space and fittingly coupled to the bottom receiving container.

According to another aspect of the present invention, there is provided a liquid crystal display (LCD) device including a light guide film guiding light, a light source disposed on at least one side of the light guide film, a bottom receiving container including a bottom plate to receive the light source and the light guide film, bottom receiving container sidewalls formed along the boundary of the bottom plate, bottom receiving container sidewall extending portions folded from upper portions of the bottom receiving container sidewalls to be spaced apart from the bottom plate while overlapping the bottom receiving container sidewalls, and a slot formed in a gap between each sidewall extending portion and the bottom plate, and an intermediate receiving container including intermediate receiving container sidewalls corresponding to the bottom receiving container sidewalls, and at least one protrusion protruding from an intermediate receiving container sidewall and fitting into one of the slots.

According to still another aspect of the present invention, there is provided a method of assembling a liquid crystal display (LCD) device, the method including providing a bottom receiving container including a bottom plate to receive the light source and the light guide film, bottom receiving container sidewalls formed along the boundary of the bottom plate to define a receiving space together with the bottom plate, and outsert-injecting a molding material for forming the intermediate receiving container into the bottom receiving container to form an intermediate receiving container including a frame formed along the bottom receiving container sidewalls and positioned within the receiving space, and intermediate receiving container fitting portions extending from the frame toward the outside of the receiving space to be securely combined with the bottom receiving container.

According to a further aspect of the present invention, there is provided a method of assembling a liquid crystal display (LCD) device, the method including providing a bottom receiving container including a bottom plate to receive the light source and the light guide film, bottom receiving container sidewalls formed along the boundary of the bottom plate, bottom receiving container sidewall extending portions folded from upper portions of the bottom receiving container sidewalls to be spaced apart from the bottom plate while overlapping the bottom receiving container sidewalls, and a slot formed in a gap between each sidewall extending portion and the bottom plate, and outsert-injecting a molding material for forming the intermediate receiving container into the bottom receiving container to form an intermediate receiving container including intermediate receiving container sidewalls corresponding to the bottom receiving container sidewalls, and a protrusion protruding from each of the intermediate receiving container sidewalls to be fittingly inserted into a corresponding slot.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS

Figure 1:
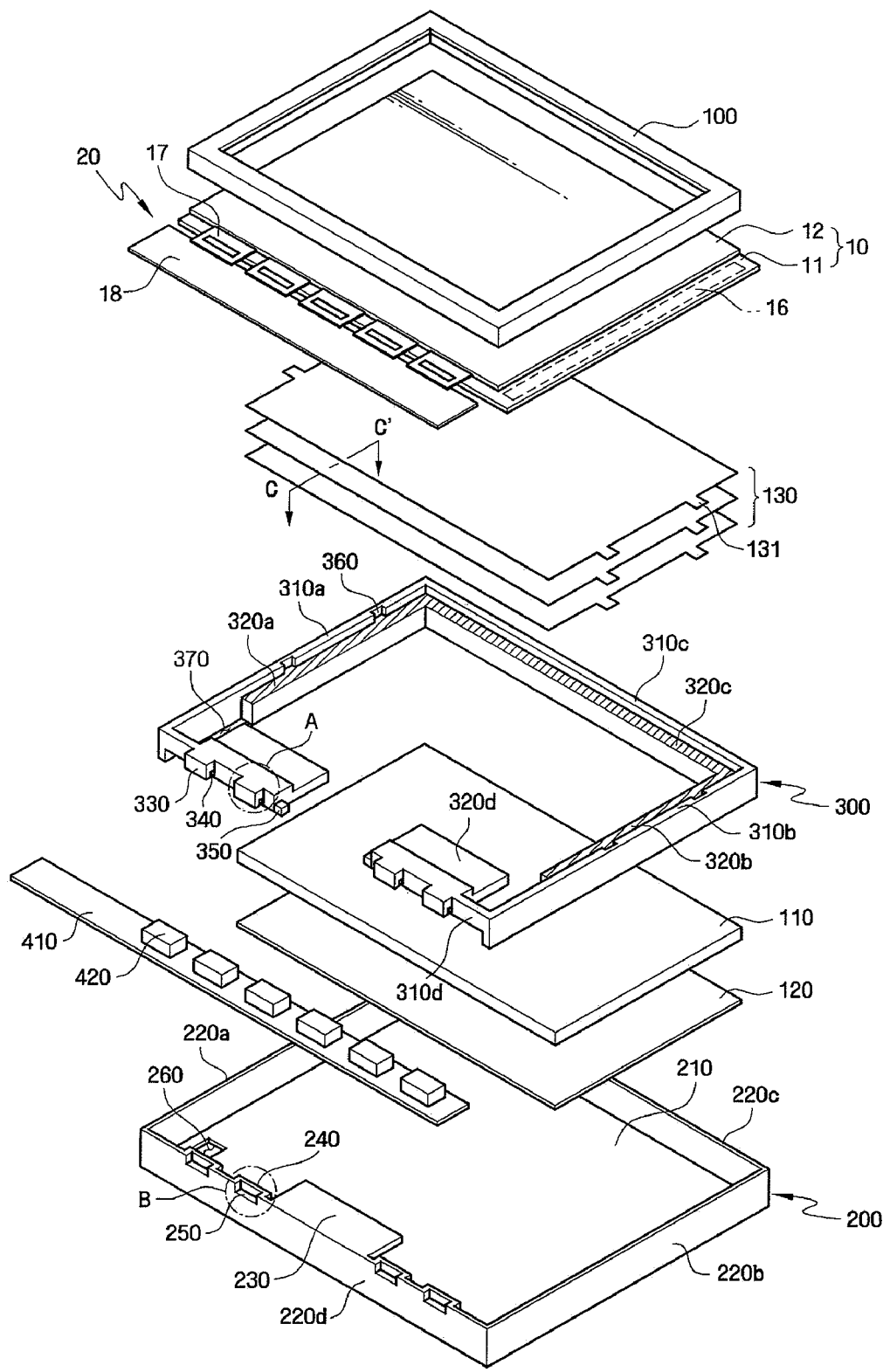
FIG. 1 is an exploded perspective view of a liquid crystal display (LCD) device according to an embodiment of the present invention.

The features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Like reference numerals may refer to like elements throughout the specification. In the drawings, the thicknesses of layers and regions may be exaggerated for clarity.

A liquid crystal display (LCD) device according to the embodiments of the present invention can be used, for example, in a notebook computer, a monitor, a portable multimedia player (PMP), a personal digital assistant (PDA), a portable digital versatile disk (DVD) player, a cellular phone, and other devices. For convenience of explanation, the LCD device according to the embodiments of the present invention will be described as being used a cellular phone. However, the present invention is not limited to this.

Referring to FIG. 1, the LCD device includes a liquid crystal panel assembly and a backlight assembly.

The liquid crystal panel assembly includes a liquid crystal panel 10 including a first substrate 11, a second substrate 12, and a polarizer plate (not shown) disposed on each of the first and second substrates 11 and 12, liquid crystals (not shown), a gate driving integrated circuit (IC) 16, a data tape carrier package 17, and a printed circuit board (PCB) 18 for driving the liquid crystal panel 10.

The liquid crystal panel 10 includes the first substrate 11 having gate lines, data lines, and pixel electrodes, the second substrate 12 opposing the first substrate 11 and having a black matrix, a color filter, and a common electrode, a first polarizing plate disposed beneath the first substrate 11, and a second polarizing plate disposed on the second substrate 12. The color filter or the common electrode may be disposed on the first substrate 11 depending on the type of the liquid crystal panel 10.

The liquid crystal panel 10 has flat-type substrates stacked and disposed on an intermediate receiving container 300, which is further described herein.

The gate driving IC 16 is integrated on the first substrate 11 and connected to the respective gate lines, and the data tape carrier package 17 is connected to the respective data lines formed on the first substrate 11.

Various components for processing gate driving signals and data driving signals may be mounted on the PCB 18 to apply the gate driving signal and the data driving signal to the gate driving IC 16 and the data tape carrier package 17.

The backlight assembly includes a light guide film (LGF) 110, a reflective sheet 120, optical sheets 130, a bottom receiving container 200, an intermediate receiving container 300, a light source unit 420, and a flexible printed circuit board (FPCB) 410 for driving the light source unit 420.

The LGF 110 may be made of a material that is capable of transmitting light, for example, an acryl resin such as polymethyl methacrylate (PMMA), or a material that has a predetermined refractive index such as polycarbonates (PC), so as to efficiently guide light.

Since the angle of light that is incident on any one lateral side or more than one lateral side of the LGF 110 made of the above-mentioned materials is in the range of a critical angle of the LGF 110, light is incident on the internal side of the LGF 110 according to an embodiment of the present invention. When light is incident on the upper surface or the lower surface of the LGF 110, since the angle of light is not in the range of the critical angle, light is not emitted from the LGF 110, but is uniformly transmitted to the inside of the LGF 110.

The LGF 110 according to an embodiment may have a thickness of about 0.1 mm to about 0.7 mm and may be shaped as a thin film, thereby achieving a thin profile for the LCD device.

A scattering pattern (not shown) may be formed on any one surface of the upper surface and the lower surface of the LGF 110, for example, the lower surface of the LGF 110, so as to emit the guided light upward. One or more light sources are disposed along at least one side of the LGF 110 to emit light.

As the light source 420, a point light source, such as a light emitting diode ("LED"), may be used for achieving a thin profile for an LCD device. Alternatively, a linear light source such as a cold cathode fluorescent lamp ("CCFL") or an external electrode fluorescent lamp (EEFL) may also be used as the light source 420.

The light sources may be arranged on the FPCB 410 in a line. The FPCB 410 is electrically connected to an inverter (not shown) for supplying power.

The reflective sheet 120 is disposed below the LGF 110 to reflect light passing downward through the bottom surface of the LGF 110 upwards back to the LGF 110.

The reflective sheet 120 may be a reflective material, for example, polyethylene terephthalate ("PET"), and a surface thereof may be coated with a diffusion layer containing, for example, titanium dioxide.

The LGF 110 and the reflective sheet 120 are seated on the bottom receiving container 200.

At least one optical sheet 130 is disposed above the LGF 110, and diffuses and condenses the light irradiated from the LGF 110. For example, the optical sheets 130 may include a diffusion sheet, a prism sheet, a protective sheet, and so on. The diffusion sheet may be disposed between the LGF 110 and the prism sheet, and can prevent light from being partially blocked by diffusing the light irradiated from the LGF 110. A prism having a triangular column shape is formed in a predetermined arrangement on one surface of the prism sheet. In addition, the diffusion sheet may condense the diffused light in a direction perpendicular to the liquid crystal panel 10. The protective sheet may be disposed above the prism sheet, and can provide for uniform distribution of light by protecting a surface of the prism sheet and diffusing the light.

The optical sheets 130 are securely placed on securing platforms 320a, 320b, 320c, and 320d of the intermediate receiving container 300.

The top receiving container 100 and the bottom receiving container 200 may be combined with each other using a hook combination or a screw combination, but are not limited thereto.

Figure 2A:
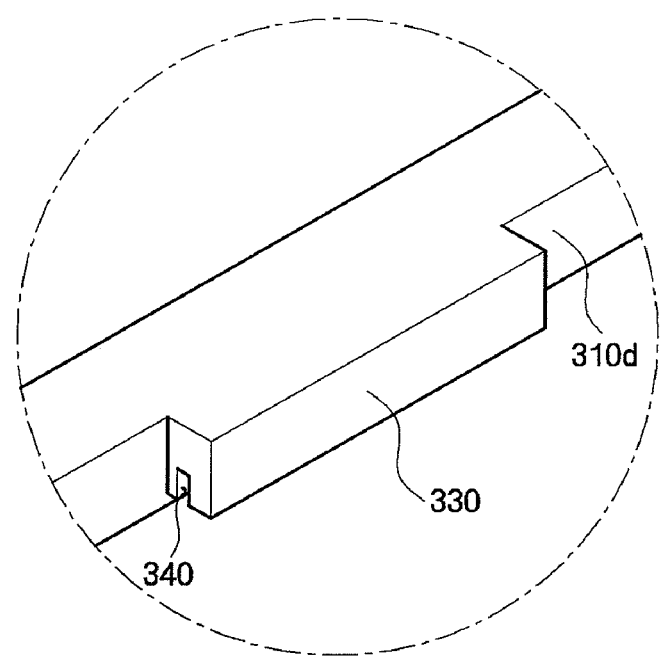
FIG. 2A is an enlarged perspective view of a region A in FIG. 1.
Figure 3:
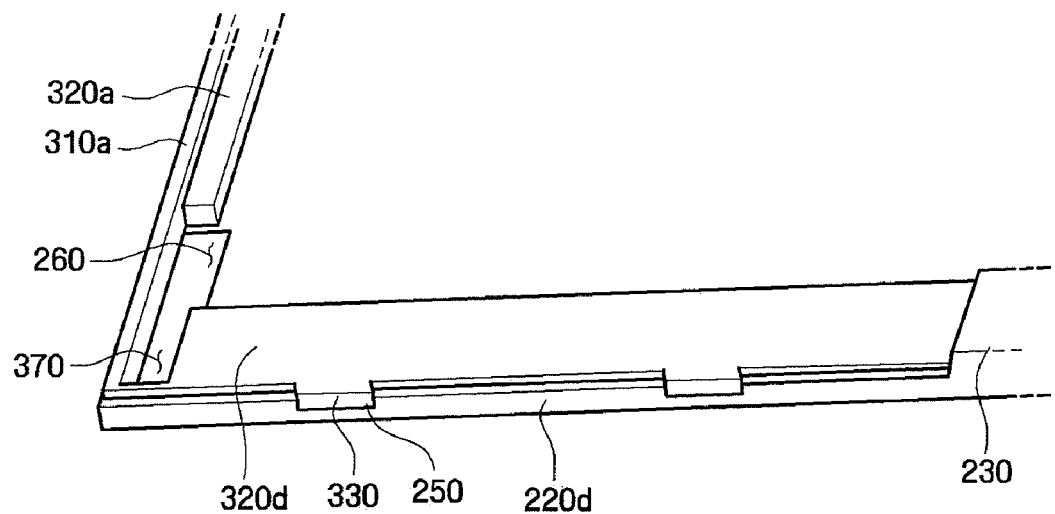
FIG. 3 is a perspective view illustrating a coupling relationship between an intermediate receiving container and a bottom receiving container included in the LCD device shown in FIG. 1.
Figure 4:
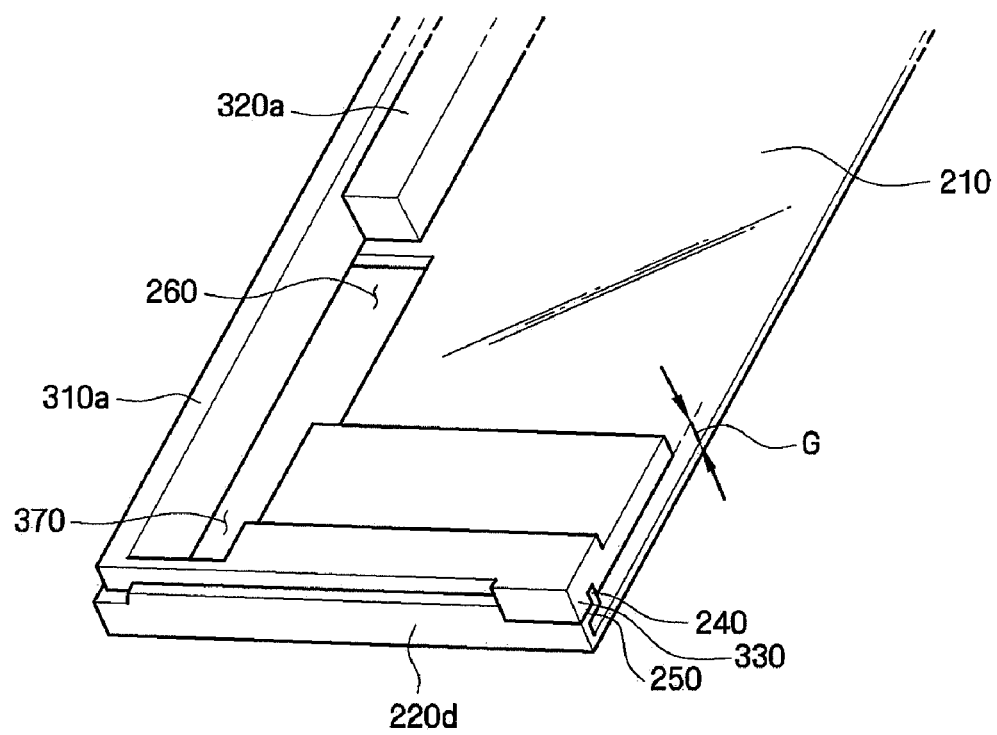
FIG. 4 is a perspective view illustrating a coupling gap between an intermediate receiving container and a bottom receiving container included in the LCD device shown in FIG. 1.
Figure 5:
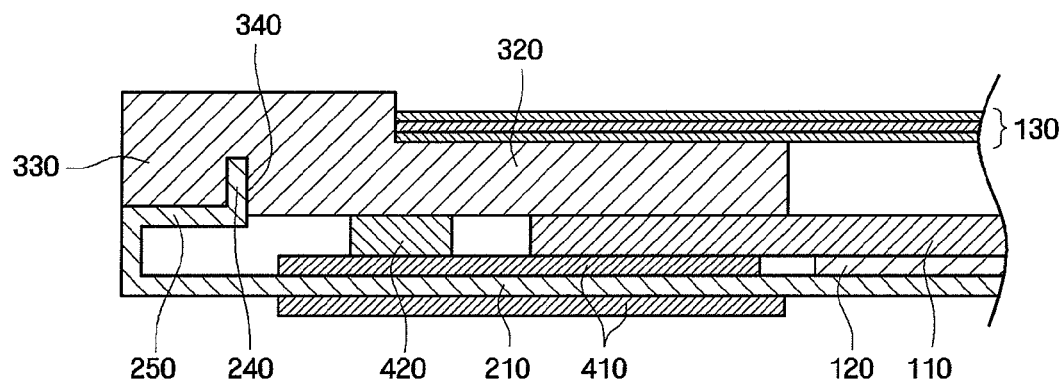
FIG. 5 is a cross-sectional view of the LCD taken along line C-C' of FIG. 1.

The bottom receiving container 200 and the intermediate receiving container 300 will be described in more detail with reference to FIGS. 1 through 5. FIG. 2A is an enlarged perspective view of a region A in FIG. 1, FIG. 2B is an enlarged perspective view of a region B in FIG. 1, FIG. 3 is a perspective view illustrating a coupling relationship between a top receiving container and a bottom receiving container included in the LCD device shown in FIG. 1, FIG. 4 is a perspective view illustrating a coupling gap between a top receiving container and a bottom receiving container included in the LCD device shown in FIG. 1, and FIG. 5 is a cross-sectional view of the LCD taken along line C-C' of FIG. 1.

Figure 2B:
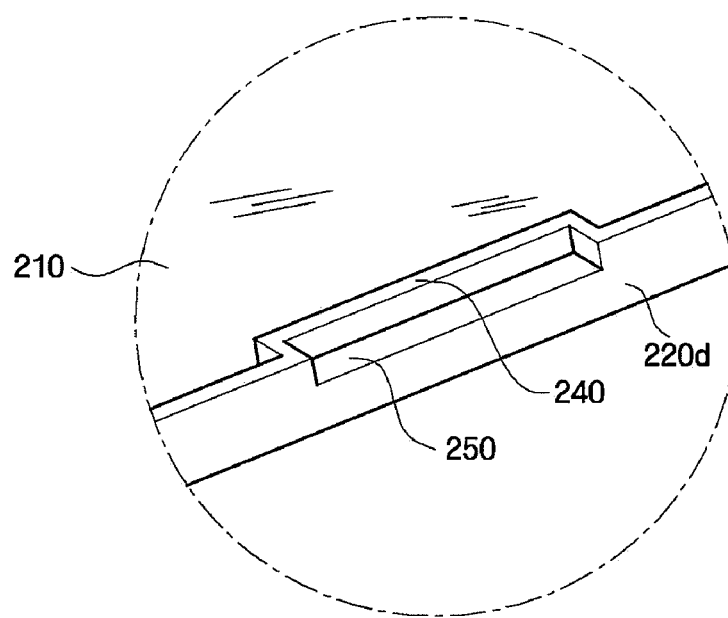
FIG. 2B is an enlarged perspective view of a region B in FIG. 1.

Referring to FIGS. 1 and 2B, the bottom receiving container 200 includes a bottom plate 210 to receive the light source unit 420 and the LGF 110, bottom receiving container sidewalls 220a, 220b, 220c and 220d formed along the boundary of the bottom plate 210 to define a receiving space together with the bottom plate 210. The bottom receiving container 200 includes a recessed sidewall portion 240 formed such that a portion of a sidewall 220a, 220b, 220c or 220d is recessed toward the inside of the bottom receiving container. A slot 250 is formed between the recessed sidewall portion 240 and the sidewall 220a, 220b, 220c or 220d. In the present embodiment, the "receiving space" may be defined by an inner surface of the bottom plate 210 and inner surfaces of the sidewalls 220a, 220b, 220c and 220d.

The bottom receiving container 200 may be made of a metallic material having rigidity, e.g., stainless steel, but is not limited thereto.

A plurality of recessed sidewall portions 240 and slots 250 may be formed along at least one of the bottom receiving container sidewalls 220a, 220b, 220c and 220d. Alternatively, the recessed sidewall portions 240 and the slots 250 may be formed along each of the bottom receiving container sidewalls 220a, 220b, 220c and 220d, respectively.

In the present embodiment, the recessed sidewall portions 240 are formed such that the sidewalls 220a, 220b, 220c or 220d are folded in a "C"-shape to form the recessed sidewall portions 240.

A first leading groove 260, through which the FPCB 410 is led outside of the bottom receiving container 200, may be provided in the bottom plate 210 of the bottom receiving container 200.

The intermediate receiving container 300 includes a frame comprising sidewalls 310a, 310b, 310c, 310d, and securing platforms 320a, 320b, 320c, and 320d formed along the bottom receiving container sidewalls 220a, 220b, 220c and 220d to be placed within the receiving space. Intermediate receiving container fitting portions 330 and 340 extend from part of the intermediate receiving container frame. For example, protrusions 330 including respective insertion grooves 340 extend from sidewall 310d toward the outside of the bottom receiving container and are fittingly coupled to the bottom receiving container 200.

The intermediate receiving container sidewalls 310a, 310b, 310c, and 310d correspond to the bottom receiving container sidewalls 220a, 220b, 220c and 220d, and further include the securing platforms 320a, 320b, 320c, and 320d.

In the present embodiment, the intermediate receiving container fitting portions 330 and 340 include protrusions 330 protruding from the intermediate receiving container sidewalls 310a, 310b, 310c, and/or 310d. The protrusions 330 fit into respective slots 250. An insertion groove 340 is formed in each respective protrusion 330 or in the intermediate receiving container sidewalls 310a, 310b, 310c, and 310d to grip the recessed sidewall portions 240.

The intermediate receiving container 300 may be made of a molding material, e.g., a plastic material, but is not limited thereto. According to an embodiment, the intermediate receiving container 300 is easily formable even if it has a complex configuration. In particular, an auxiliary fastening means protruding from the intermediate receiving container 300 is easily formed.

Referring to FIGS. 2A and 2B, the protrusion 330 of the intermediate receiving container 300 closely contacts the bottom surface of the slot 250 and the recessed sidewall portion 240. Accordingly, horizontal movement of the intermediate receiving container 300 and the bottom receiving container 200 can be prevented, and the intermediate receiving container 300 can be securely fixed with the bottom receiving container 200.

The insertion groove 340 grips the recessed sidewall portion 240, thereby preventing vertical movement of the bottom receiving container 200 and the intermediate receiving container 300.

Referring to FIGS. 1, and 3 through 5, the bottom receiving container 200 may further include a folded fixing portion 230 folded from at least one of the bottom receiving container sidewalls 220a, 220b, 220c and 220d. The folded fixing portion 230 is pressed downward toward the LGF 110 and is then fixed. Although not shown, in order to prevent light leakage, a reflective tape may be attached to the bottom surface of the folded fixing portion 230.

At least one sidewall 310d of the intermediate receiving container sidewalls is cut at a position corresponding to the folded fixing portion 230 to allow the cut intermediate receiving container sidewall to be opposed with respect to the folded fixing portion 230. A folded fixing portion coupling protrusion 350 is formed at each respective end of the opposed portions of the intermediate receiving container sidewall 310d so that the coupling protrusions engage the folded fixing portion 230.

The intermediate receiving container 300 may further include securing platforms 320a, 320b, 320c, and 320d protruding from the intermediate receiving container sidewalls 310a, 310b, 310c, and 310d to form stepped portions with respect to the intermediate receiving container sidewalls 310a, 310b, 310c, and 310d. The optical sheet 130 and the liquid crystal panel 18 may be seated on the securing platforms 320a, 320b, 320c, and 320d.

One or more sheet fixing grooves 360 may be formed in the intermediate receiving container sidewalls 310a, 310b, 310c, and 310d. One or more sheet protrusions 131 may be formed to extend from at least one side of an optical sheet 130. The sheet protrusions 131 are inserted into the corresponding sheet fixing grooves 360, thereby preventing movement of the optical sheet 130.

At least one sidewall 310d of the intermediate receiving container sidewalls 310a, 310b, 310c, and 320d may be formed to have a smaller height than the other intermediate receiving container sidewalls. Referring to FIG. 4, the securing platforms 320d protruding from the shorter sidewall 310d are spaced a predetermined gap G from the bottom plate 210 of the bottom receiving container 200, and the FPCB 410 having the light source unit 420 mounted on the securing platforms 320d, and the LGF 110 may be disposed in the gap G.

In other words, the LGF 110 is fixed by the folded fixing portion 230. The LGF 110 is fixed at both sides of the folded fixing portion 230 in a state in which the LGF 110 is pressed by the securing platforms 320d. In order to securely fix the LGF 110 with the reflective sheet 120, a double-sided adhesive tape may be attached to a bottom surface of the reflective sheet 120 and a bottom surface of the LGF 110.

Figure 6:
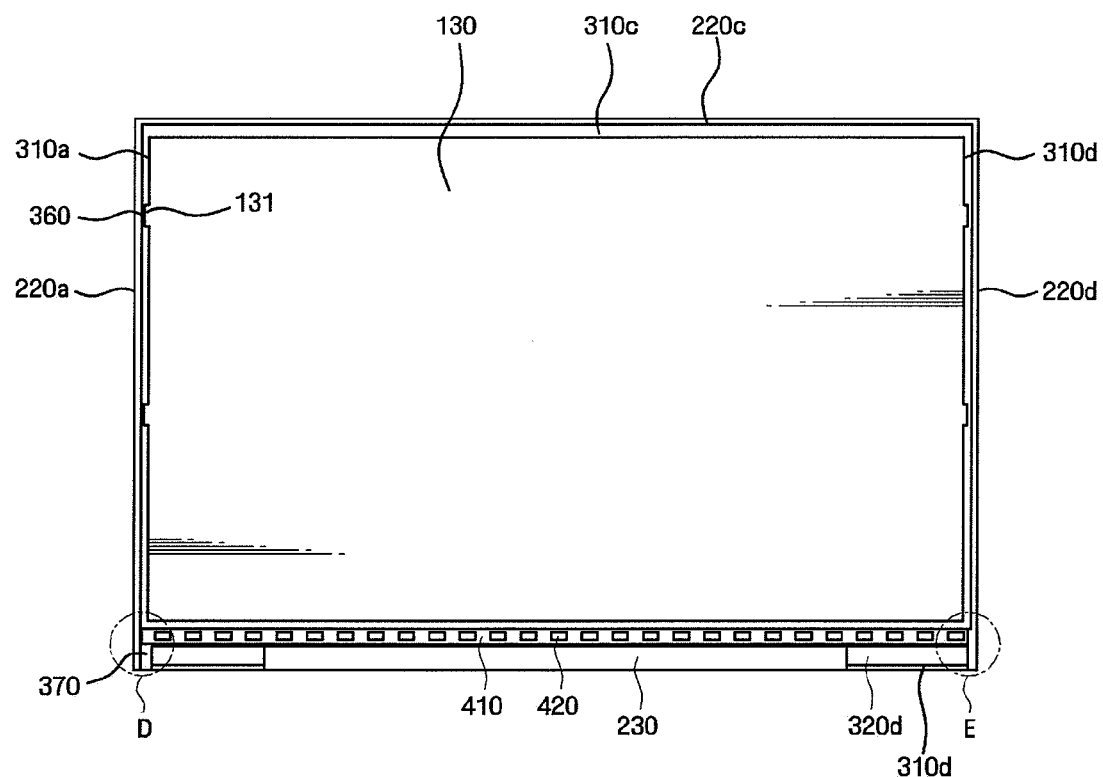
FIG. 6 is a view illustrating a positional relationship of an intermediate receiving container, a bottom receiving container, and a flexible printed circuit board for driving a light source of the LCD device shown in FIG. 1.
Figure 7:
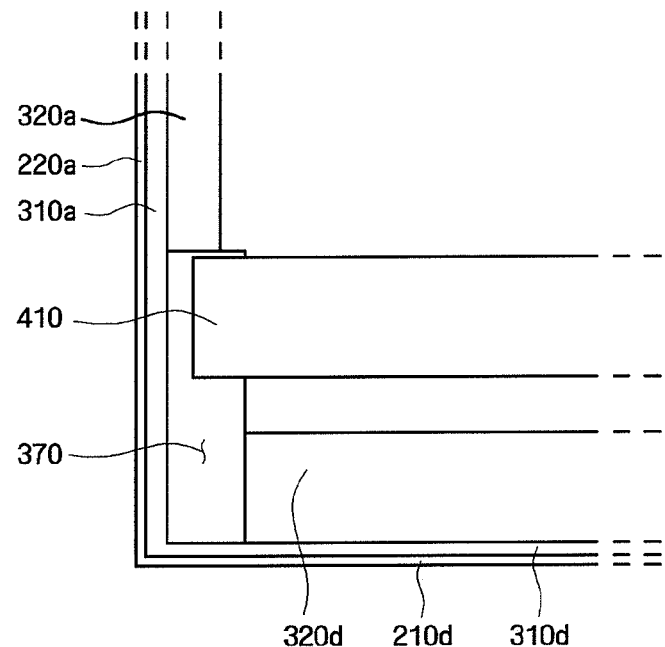
FIG. 7 is an enlarged perspective view of a region D in FIG. 6.
Figure 8:
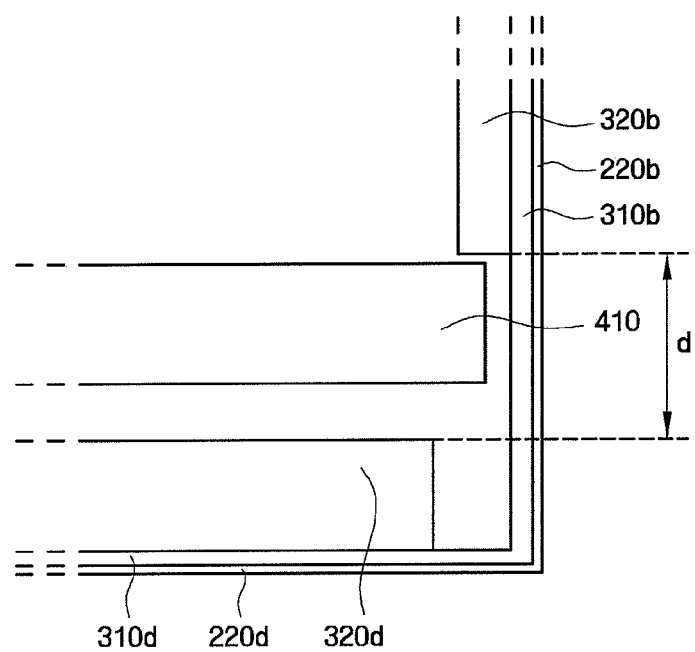
FIG. 8 is an enlarged perspective view of a region E in FIG. 6.

A coupling relationship between a light source and a flexible printed circuit board (FPCB) for driving the light source will be described with reference to FIGS. 1 and 5 through 8. FIG. 6 is a view illustrating a positional relationship of a top receiving container, a bottom receiving container, and a flexible printed circuit board of the LCD device shown in FIG. 1, FIG. 7 is an enlarged perspective view of a region D in FIG. 6, and FIG. 8 is an enlarged perspective view of a region E in FIG. 6.

The first leading groove 260, through which the FPCB 410 is led outside of the bottom receiving container 200, may be provided at the edge of the bottom plate 210 of the bottom receiving container 200. A second leading groove 370, through which the FPCB 410 is led outside, may also be provided at one edge of the intermediate receiving container 300.

The FPCB 410 is disposed between the securing platform 320d of the intermediate receiving container 300 and the bottom plate 210 of the bottom receiving container 200. The securing platforms 320a and 320b may be shortened at one end, so that the FPCB 410 can be placed in the bottom receiving container 200. In further detail, in a case where the securing platforms 320a and 320b formed perpendicular to the securing platform 320d, it may be difficult to place the FPCB 410 between the securing platform 320d and the bottom plate 210. Accordingly, the securing platforms 320a and 320b are spaced apart a predetermined distance d from the horizontal securing platform 320d.

The FPCB 410 may be led toward the bottom surface of the bottom receiving container 200 through the first leading groove 260 of the bottom receiving container 200 and the second leading groove 370 of the intermediate receiving container 300. The FPCB 410 is connected to an inverter (not shown) to apply power thereto.

Figure 9:
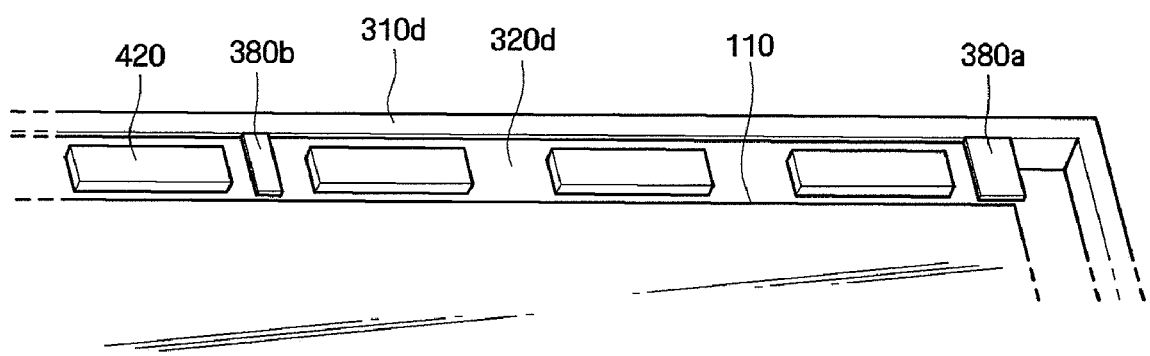
FIG. 9 is a perspective view illustrating a positional relationship between a light guide film (LGF) and a light source in the LCD device shown in FIG. 1.

A positional relationship between a light guide film and an intermediate receiving container will be described in more detail with reference to FIGS. 1 and 9. FIG. 9 is a perspective view illustrating a positional relationship between an LGF and a light source in the LCD device shown in FIG. 1.

Referring to FIGS. 1 and 9, LGF stoppers 380a and 380b may be formed on the bottom surface of at least one of the securing platforms 320a, 320b, 320c, and 320d of the intermediate receiving container 300, for example, securing platform 320d. The LGF stoppers 380a and 380b prevent movement of the LGF 110 by fixing the LGF 110, while preventing breakage of the light source unit 420 due to the movement of the LGF 110. To this end, a distance between each of the intermediate receiving container sidewalls 310a, 310b, 310c, and 310d and the end of each of the LGF stoppers 380a and 380b may be longer than a distance between each of the intermediate receiving container sidewalls 310a, 310b, 310c, and 310d and the end of the light source unit 420. The LGF stoppers 380a and 380b may be disposed between the light source unit 420 and its adjacent light source unit 420 as well as on the edge of the intermediate receiving container 300. The LGF stopper 380b disposed between the light source units 420 can further securely fix the LGF 110.

Figure 10:
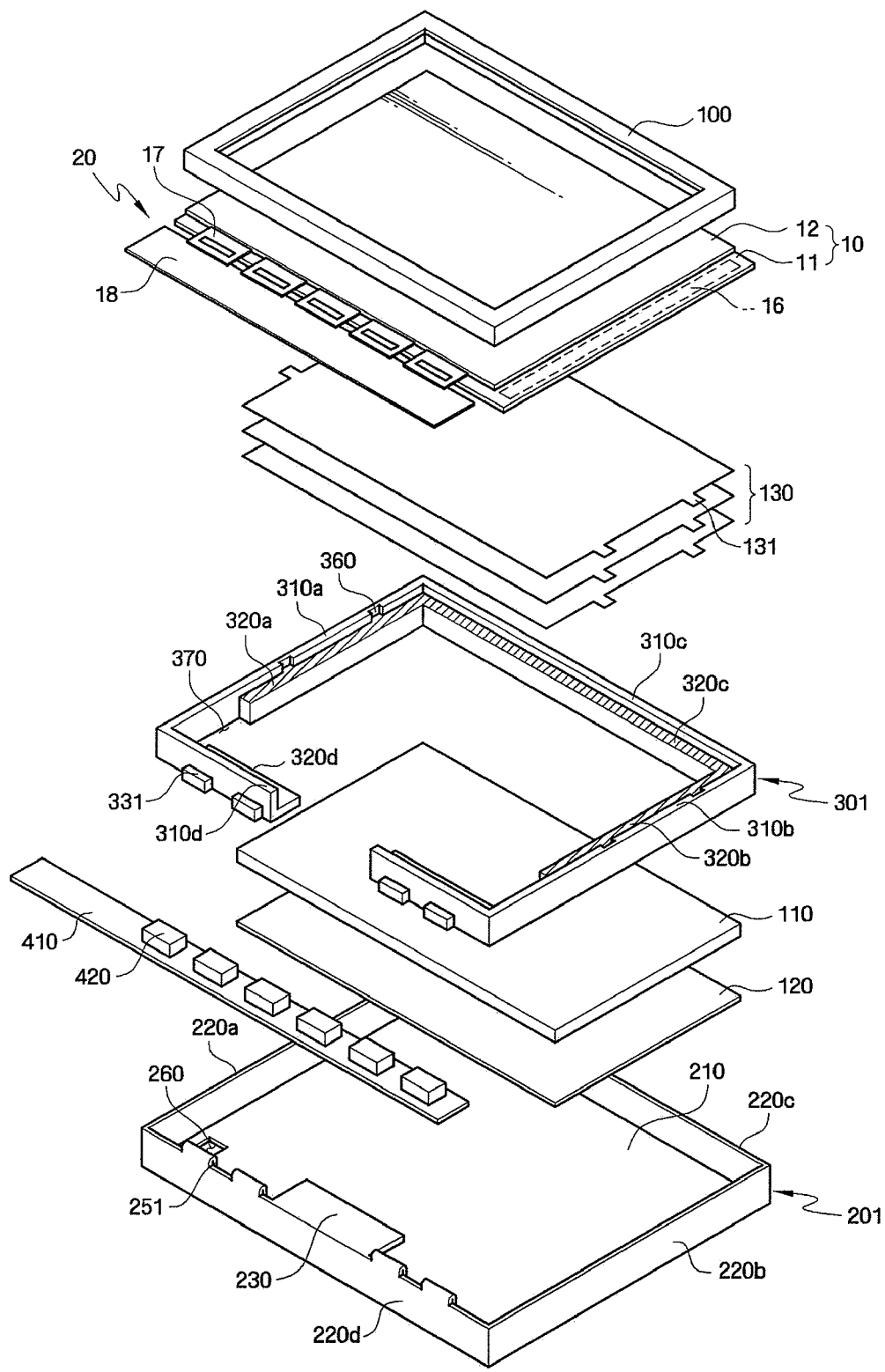
FIG. 10 is an exploded perspective view of a liquid crystal display (LCD) device according to an embodiment of the present invention.

Hereinafter, a liquid crystal display (LCD) device according to an embodiment of the present invention will be described in detail with reference to FIGS. 10 through 12. FIG. 10 is an exploded perspective view of a liquid crystal display (LCD) device according to an embodiment of the present invention, FIG. 11 is a perspective view partially illustrating a bottom receiving container contained in the LCD device shown in FIG. 10, and FIG. 12 is a perspective view partially illustrating a positional relationship between a bottom receiving container and an intermediate receiving container included in the LCD device shown in FIG. 10.

Figure 11:
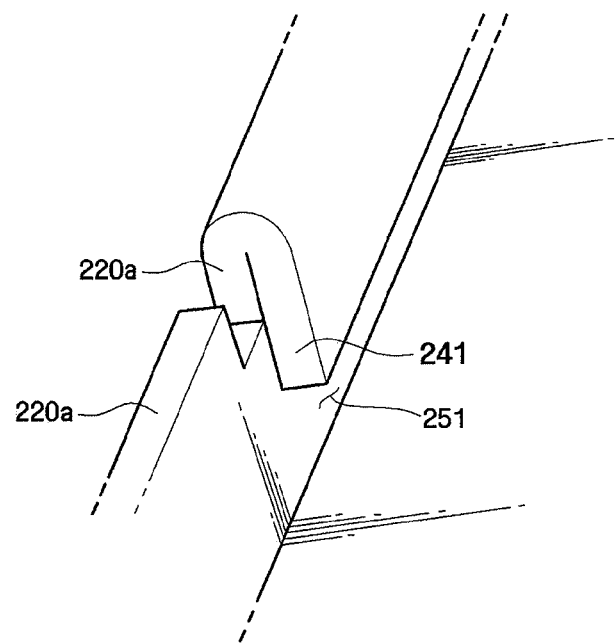
FIG. 11 is a perspective view partially illustrating a bottom receiving container contained in the LCD device shown in FIG. 10.
Figure 12:
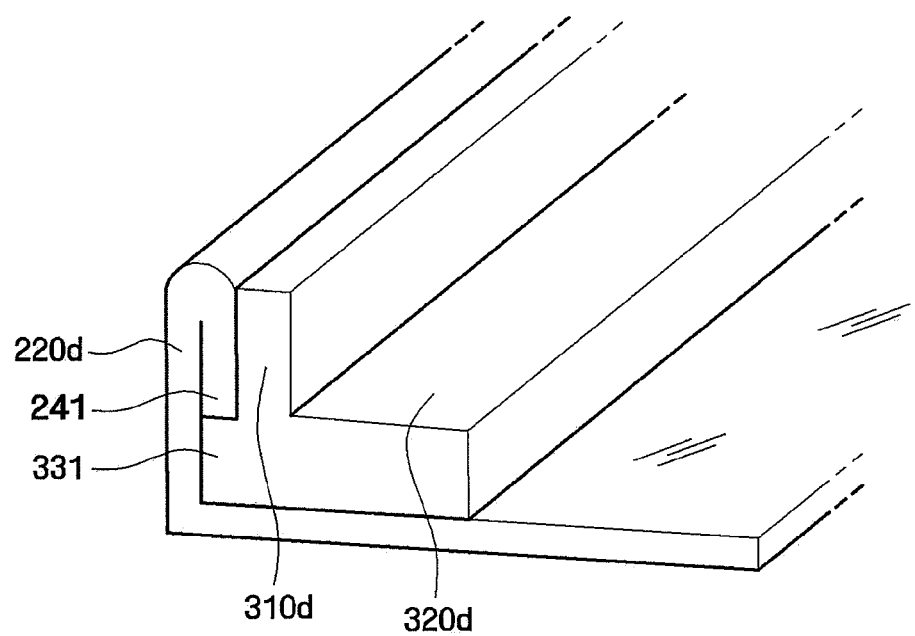
FIG. 12 is a perspective view partially illustrating a positional relationship between a bottom receiving container and an intermediate receiving container included in the LCD device shown in FIG. 10.

Referring to FIGS. 10 through 12, the bottom receiving container 201 according to an embodiment of the present invention includes a sidewall extending portion 241 folded from upper portions of the bottom receiving container sidewalls 220a, 220b, 220c and 220d to be spaced apart from the bottom plate 210 while overlapping the bottom receiving container sidewalls 220a, 220b, 220c and 220d. A slot 251 is formed in a gap between the sidewall extending portion 241 and the bottom plate 210.

A protrusion 331 protruding from the intermediate receiving container sidewalls 310a, 310b, 310c, and 310d is inserted into the slot 251 to securely fix the intermediate receiving container 301 with the bottom receiving container 201. The protrusion 331 may protrude toward an opposite side of the securing platforms 320a, 320b, 320c, and 320d, that is, toward a sidewall of the bottom receiving container 201.

The intermediate receiving container sidewalls 310a, 310b, 310c, and 310d are relatively thinner at a position corresponding to the sidewall extending portion 241, and are relatively thicker at positions where the sidewall extending portion 241 is not formed. A side of the relatively thicker portion of the intermediate receiving container sidewalls 310a, 310b, 310c, and 310d may closely contact a side of the sidewall extending portion 241, so that the bottom receiving container 201 can be securely fixed with the intermediate receiving container 301.

Figure 13:
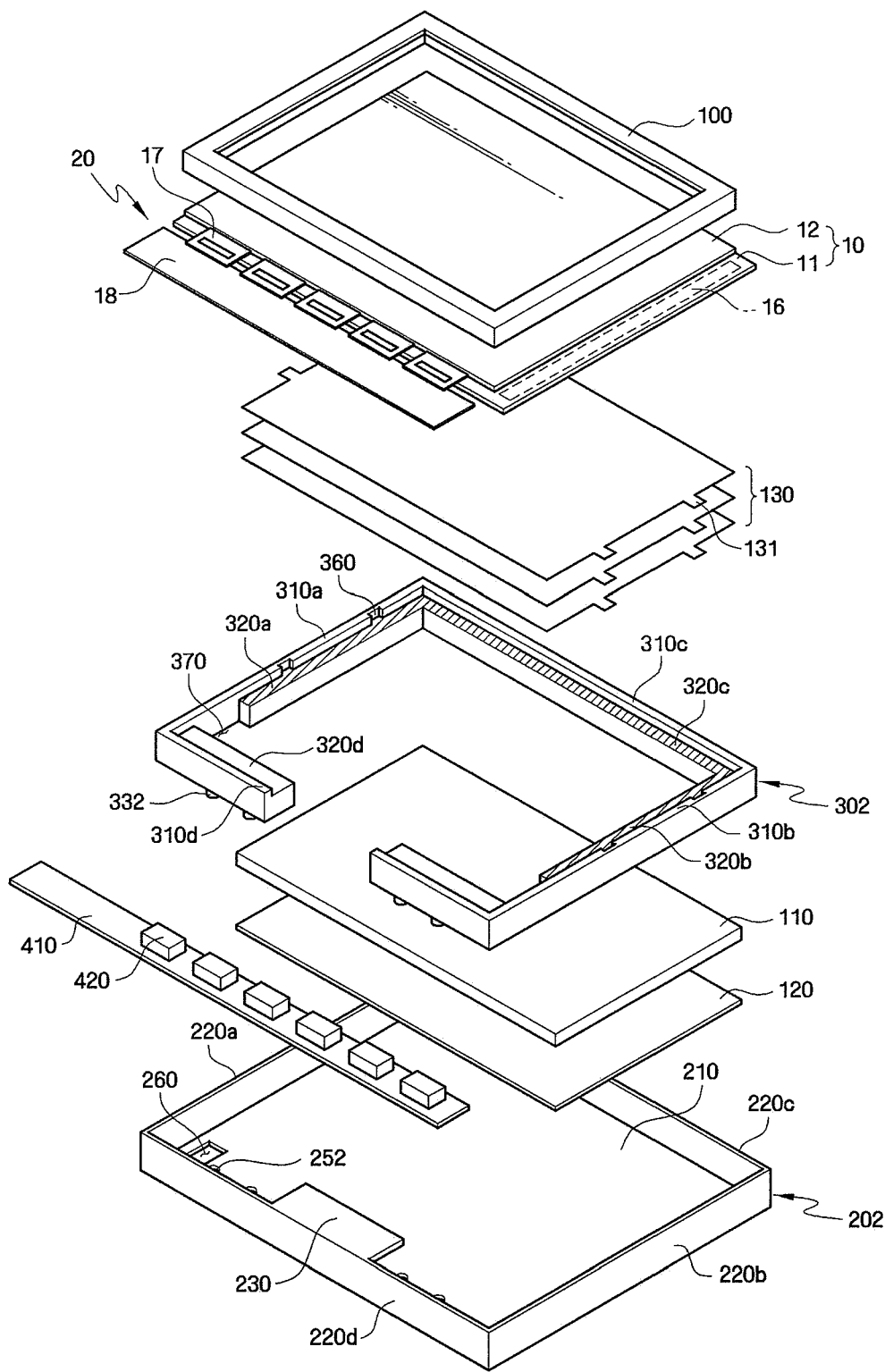
FIG. 13 is an exploded perspective view of a liquid crystal display (LCD) device according to an embodiment of the present invention.
Figure 14:
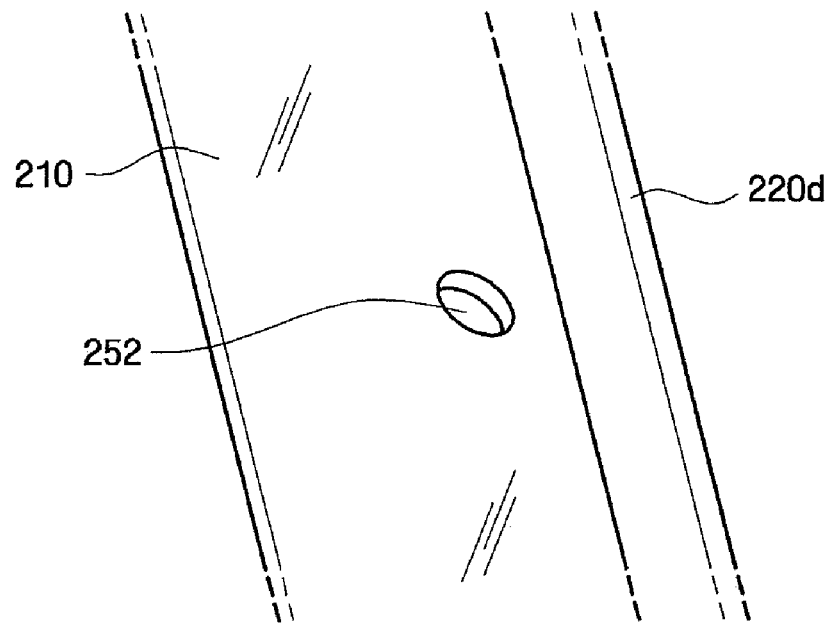
FIG. 14 is a perspective view partially illustrating a bottom receiving container contained in the LCD device shown in FIG. 13.
Figure 15:
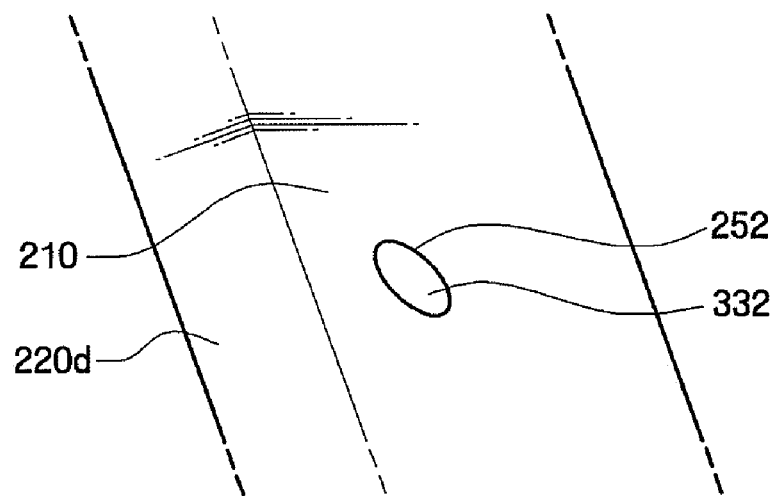
FIG. 15 is a bottom perspective view illustrating a positional relationship between a bottom receiving container and an intermediate receiving container included in the LCD device shown in FIG. 13.
Figure 16:
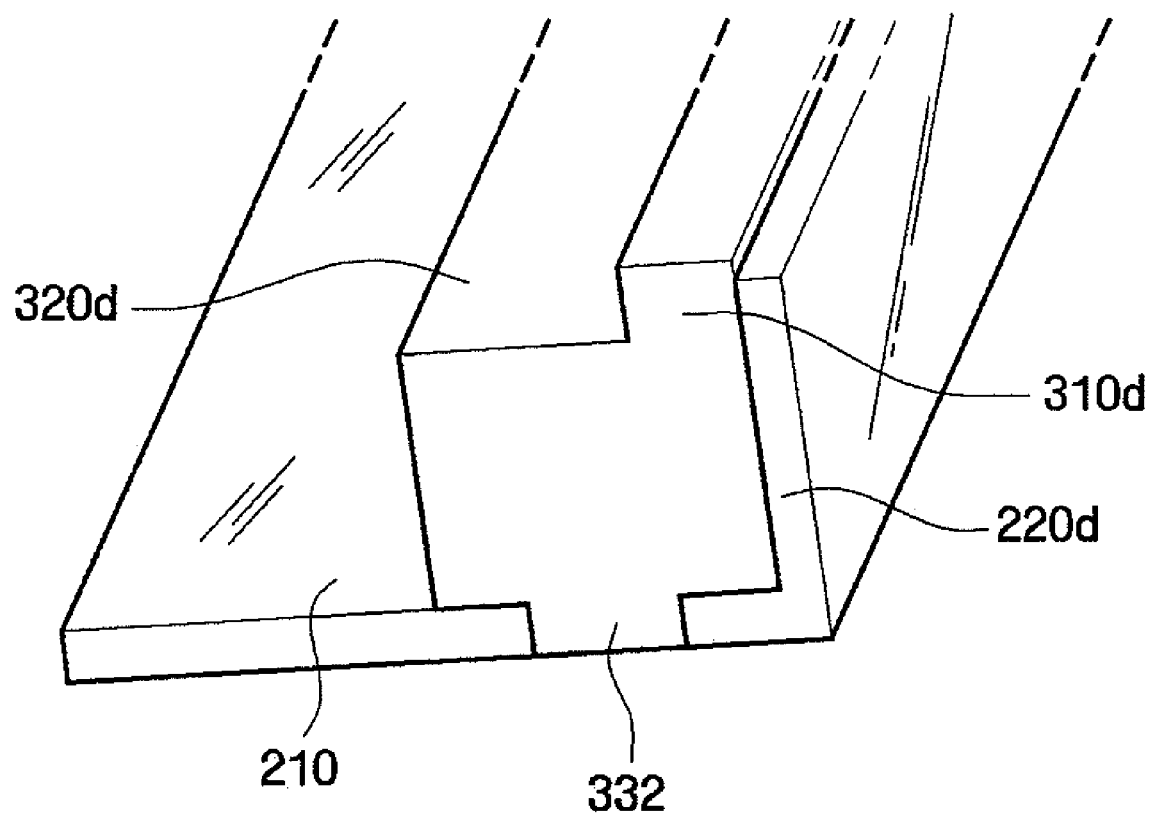
FIG. 16 is a perspective view partially illustrating a positional relationship between a bottom receiving container and an intermediate receiving container included in the LCD device shown in FIG. 13.

A liquid crystal display (LCD) device according to an embodiment of the present invention will be described in detail with reference to FIGS. 13 through 16. FIG. 13 is an exploded perspective view of a liquid crystal display (LCD) device according to an embodiment of the present invention, FIG. 14 is a perspective view partially illustrating a bottom receiving container contained in the LCD device shown in FIG. 13, FIG. 15 is a bottom perspective view illustrating a positional relationship between a bottom receiving container and an intermediate receiving container included in the LCD device shown in FIG. 13, and FIG. 16 is a perspective view partially illustrating a positional relationship between a bottom receiving container and an intermediate receiving container included in the LCD device shown in FIG. 13.

Referring to FIGS. 13 through 16, a bottom receiving container 202 according to an embodiment of the present invention includes a throughhole 252 formed in a bottom plate 210 of the bottom receiving container 202.

In the present embodiment, a protrusion 332 protruding from intermediate receiving container frame is fittingly inserted into the throughhole 252.

The protrusion 332 protrudes from the bottom surface of securing platforms 320a, 320b, 320c, and 320d and/or the bottom surface of the intermediate receiving container sidewalls 310a, 310b, 310c, and 310d to be inserted into the throughhole 252. Accordingly, the bottom receiving container 202 is securely engaged with the intermediate receiving container 302.

Figure 17:
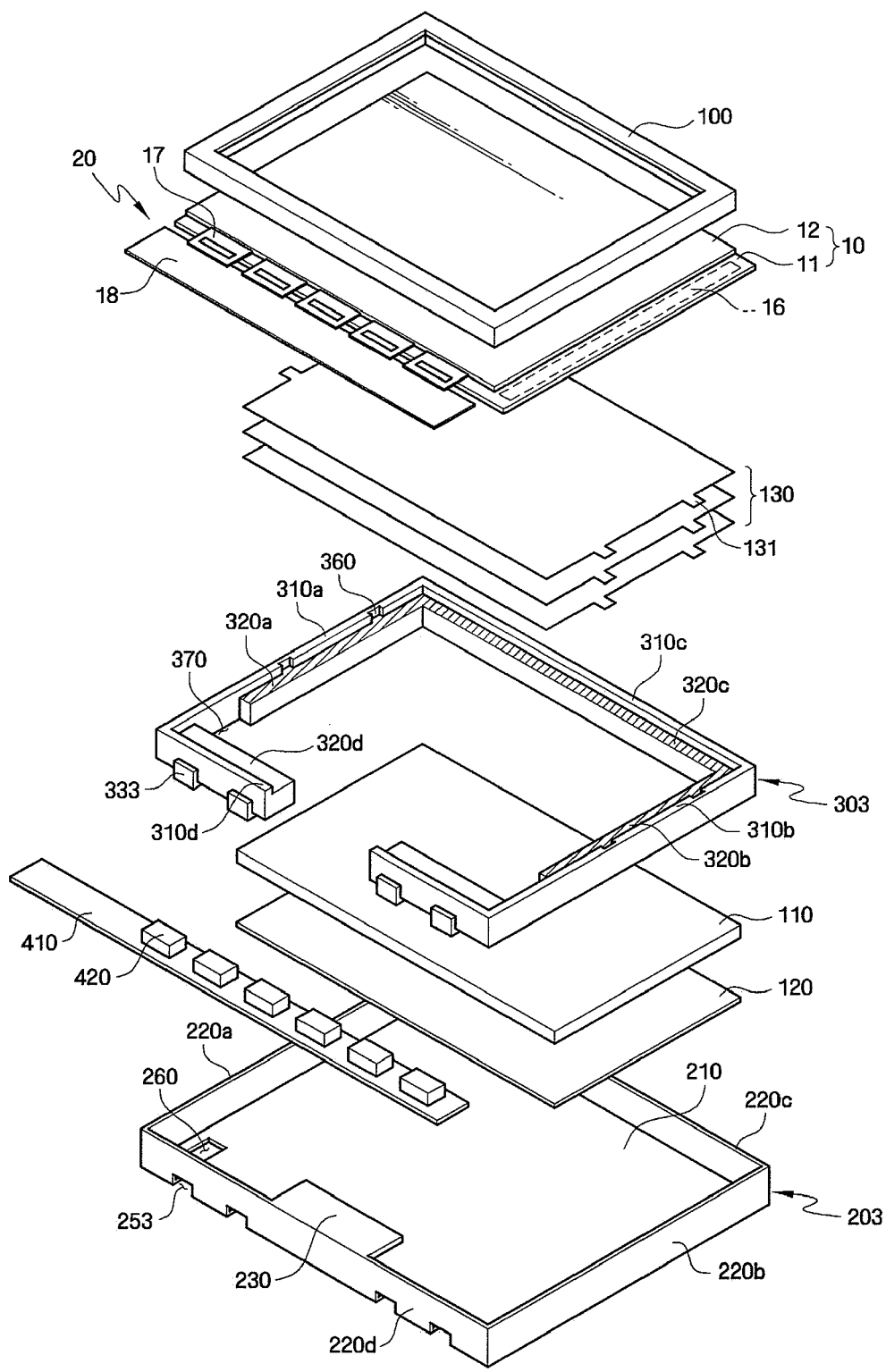
FIG. 17 is an exploded perspective view of a liquid crystal display (LCD) device according to an embodiment of the present invention.
Figure 18:
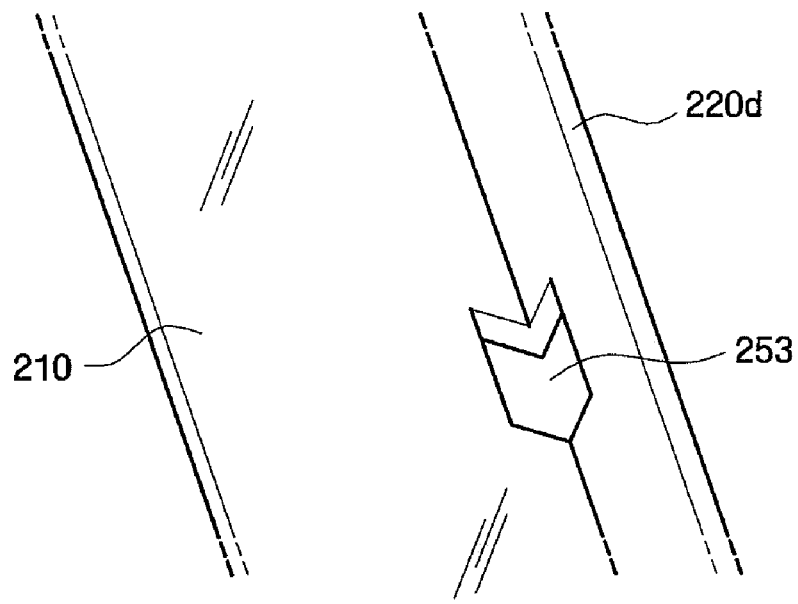
FIG. 18 is a perspective view partially illustrating a bottom receiving container contained in the LCD device shown in FIG. 17.
Figure 19:
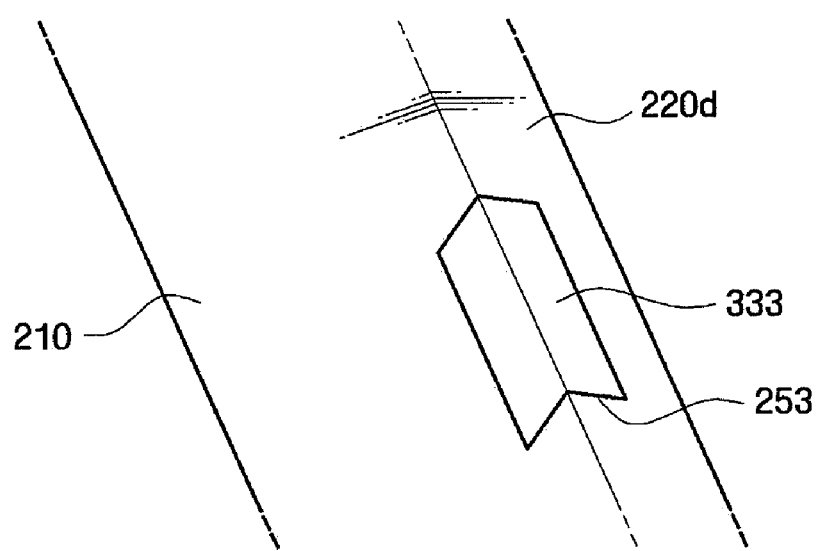
FIG. 19 is a bottom perspective view illustrating a positional relationship between a bottom receiving container and an intermediate receiving container included in the LCD device shown in FIG. 17.
Figure 20:
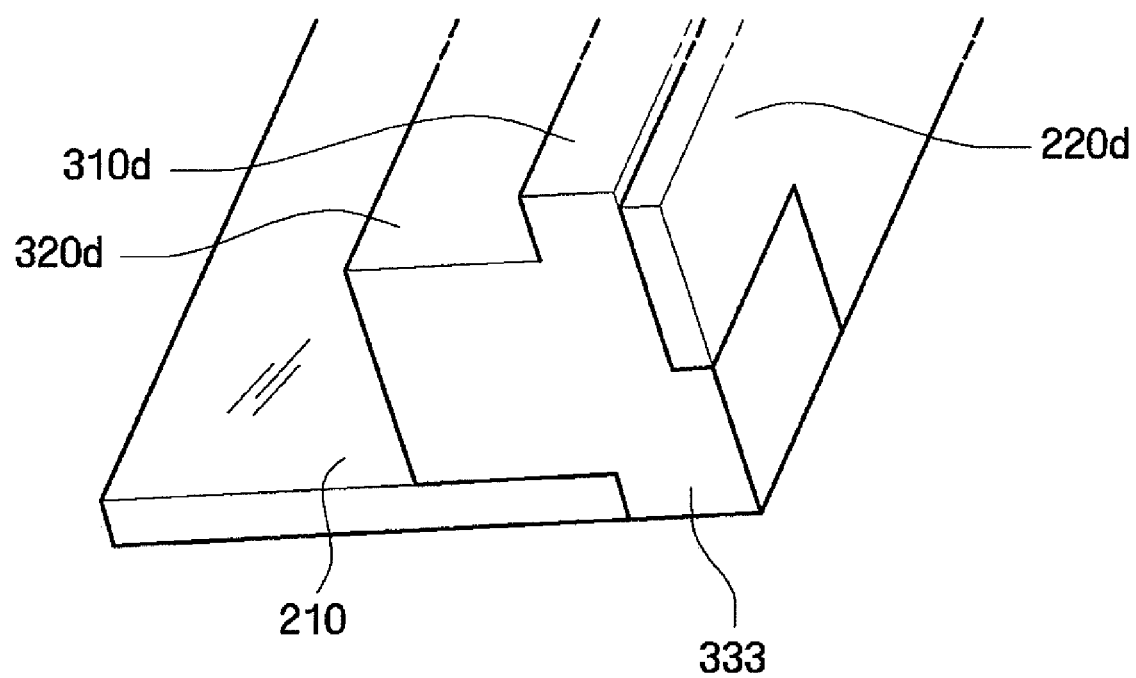
FIG. 20 is a perspective view partially illustrating a positional relationship between a bottom receiving container and an intermediate receiving container included in the LCD device shown in FIG. 17.

A liquid crystal display (LCD) device according to an embodiment of the present invention will be described in detail with reference to FIGS. 17 through 20. FIG. 17 is an exploded perspective view of a liquid crystal display (LCD) device according to an embodiment of the present invention, FIG. 18 is a perspective view partially illustrating a bottom receiving container contained in the LCD device shown in FIG. 17, FIG. 19 is a bottom perspective view illustrating a positional relationship between a bottom receiving container and an intermediate receiving container included in the LCD device shown in FIG. 17, and FIG. 20 is a perspective view partially illustrating a positional relationship between a bottom receiving container and an intermediate receiving container included in the LCD device shown in FIG. 17.

In the present embodiment, a throughhole 253 of a bottom receiving container 203 is integrally formed in the bottom plate 210 and the bottom surface of the sidewalls 220a, 220b, 220c and 220d. In other words, the throughhole 253 of the present embodiment may have an "L"-shape so as to penetrate both the bottom plate 210 and the sidewalls 220a, 220b, 220c and 220d.

In the present embodiment, an intermediate receiving container fitting portion of an intermediate receiving container 303 includes a protrusion 333 protruding from the intermediate receiving container frame to be inserted into the throughhole 253.

The protrusion 333 protrudes perpendicular to bottom surfaces of securing platforms 320a, 320b, 320c, and 320d and/or perpendicular to lateral surfaces of intermediate receiving container sidewalls 310a, 310b, 310c, and 310d to be inserted into the throughhole 253. Accordingly, the bottom receiving container 203 is securely engaged with the intermediate receiving container 303.

Figure 21:
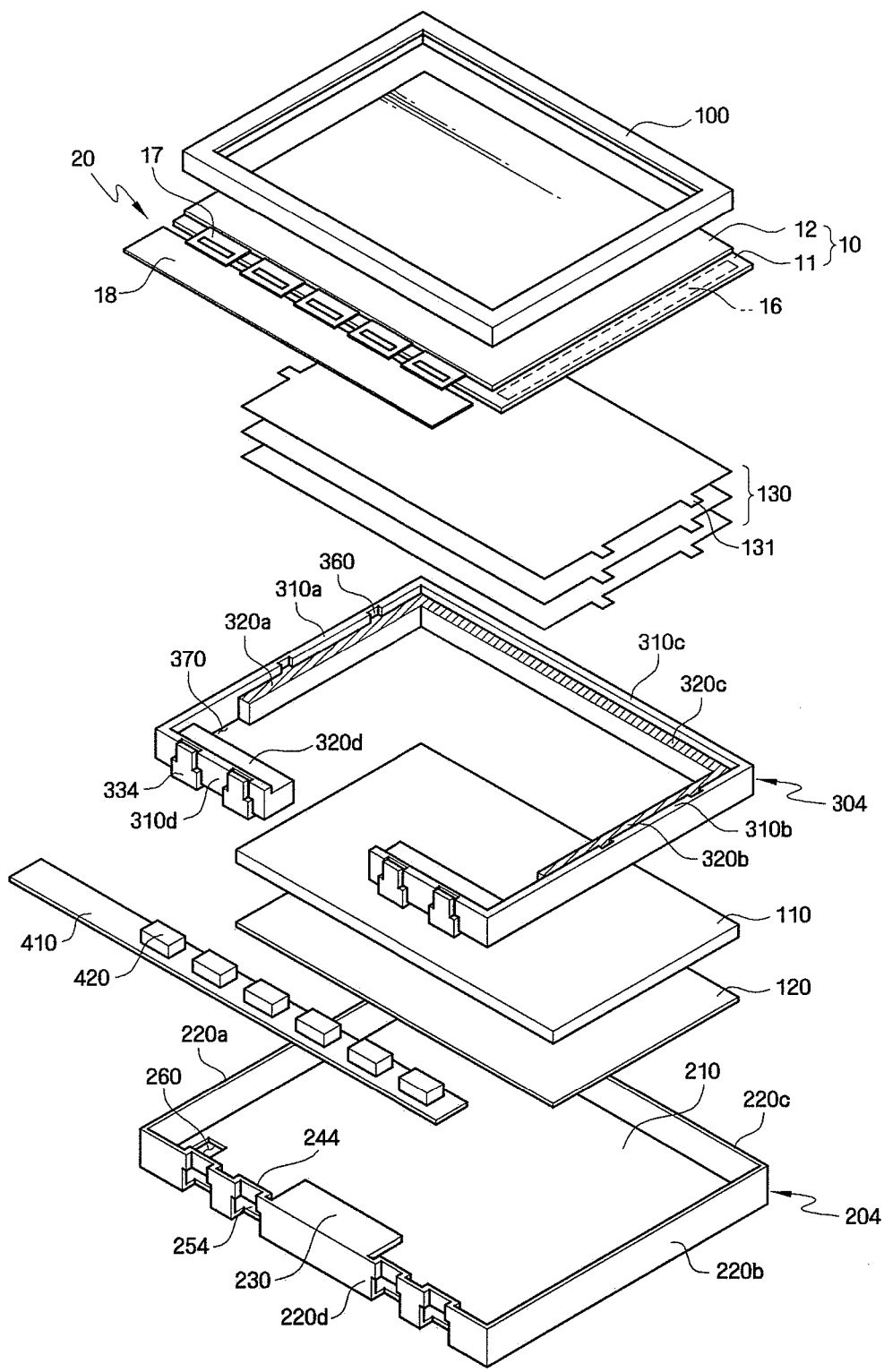
FIG. 21 is an exploded perspective view of a liquid crystal display (LCD) device according to an embodiment of the present invention.
Figure 22:
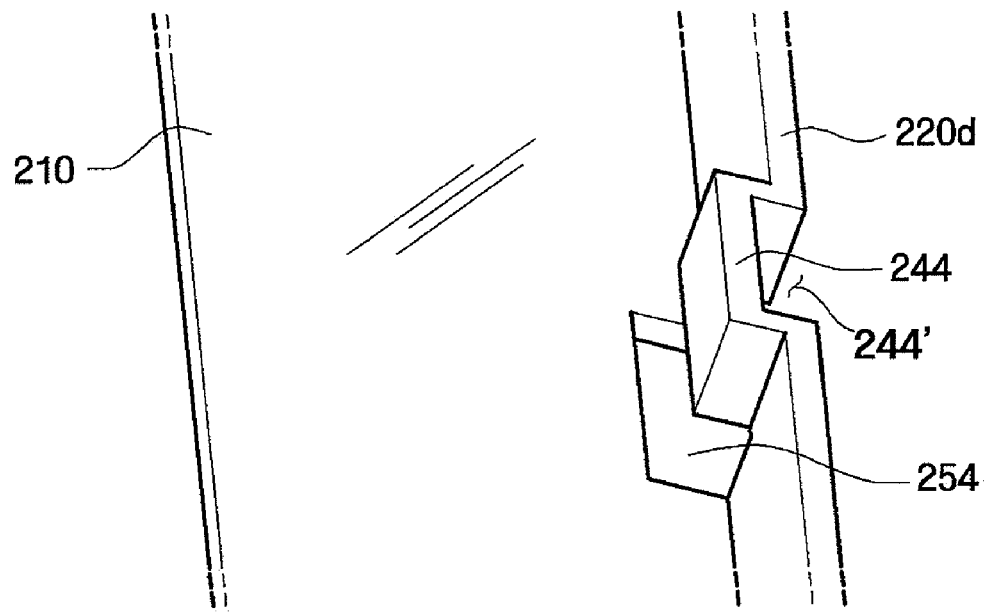
FIG. 22 is a perspective view partially illustrating a bottom receiving container contained in the LCD device shown in FIG. 21.
Figure 23:
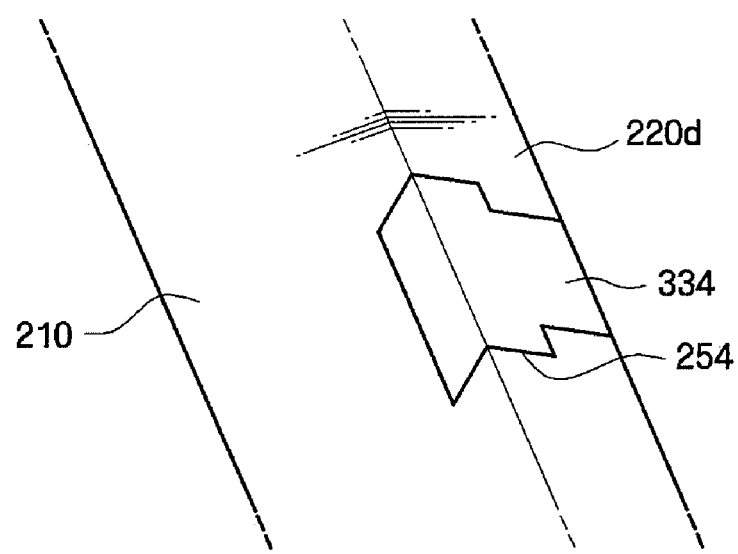
FIG. 23 is a bottom perspective view illustrating a positional relationship between a bottom receiving container and an intermediate receiving container included in the LCD device shown in FIG. 21.
Figure 24:
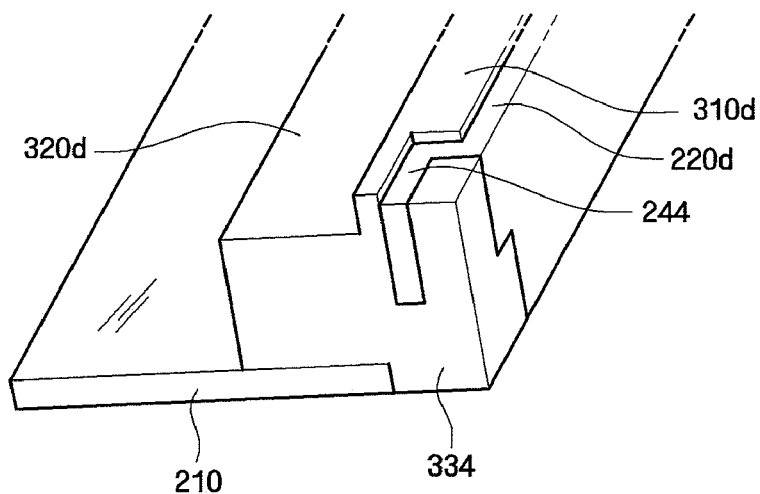
FIG. 24 is a perspective view partially illustrating a positional relationship between a bottom receiving container and an intermediate receiving container included in the LCD device shown in FIG. 21.

A liquid crystal display (LCD) device according to an embodiment of the present invention will be described in detail with reference to FIGS. 21 through 24. FIG. 21 is an exploded perspective view of a liquid crystal display (LCD) device according to an embodiment of the present invention, FIG. 22 is a perspective view partially illustrating a bottom receiving container contained in the LCD device shown in FIG. 21, FIG. 23 is a bottom perspective view illustrating a positional relationship between a bottom receiving container and an intermediate receiving container included in the LCD device shown in FIG. 21, and FIG. 24 is a perspective view partially illustrating a positional relationship between a bottom receiving container and an intermediate receiving container included in the LCD device shown in FIG. 21.

Referring to FIGS. 21 through 24, a bottom receiving container 204 according to the present embodiment further includes a throughhole 254 integrally formed with a bottom plate 210 and bottom receiving container sidewalls 220a, 220b, 220c and 220d. The throughhole 254 is formed to open the bottom receiving container sidewalls 220a, 220b, 220c and 220d along the depth direction. The throughhole 254 of the present embodiment may be shaped in an "L"-shape so as to penetrate both the bottom plate 210 and the bottom receiving container sidewalls 220a, 220b, 220c and 220d.

The throughhole 254 may also have an "L"-shape so as to open both the bottom plate 210 and the bottom receiving container side walls 220a, 220b, 220c and 220d.

The bottom receiving container 204 according to the present embodiment further includes a recessed sidewall portion 244 formed such that a portion of each of the bottom receiving container sidewalls 220a, 220b, 220c and 220d is recessed toward the inside of the bottom receiving container 204. A slot 244' is formed between the recessed sidewall portion 244 and the bottom receiving container sidewalls 220a, 220b, 220c and 220d, and the throughhole 254 opens the lower portion of the slot 244'.

An intermediate receiving container 304 according to the present embodiment includes a protrusion 334. The protrusion 334 protrudes from bottom surfaces of securing platforms 320a, 320b, 320c, and 320d and/or from intermediate receiving container sidewalls 310a, 310b, 310c, and 310d to be inserted into the throughhole 254. In addition, the recessed side wall portion 244 is gripped by the protrusion 334 and the intermediate receiving container sidewalls 310a, 310b, 310c, and 310d. Accordingly, the bottom receiving container 204 is securely engaged with the intermediate receiving container 304.

A method of assembling an LCD device according to an embodiment of the present invention will be described in detail with reference to FIGS. 1, 10, 13, 17, and FIGS. 25 through 28. FIGS. 25 through 28 are perspective views sequentially showing a method of assembling an LCD device according to an embodiment of the present invention.

Figure 25:
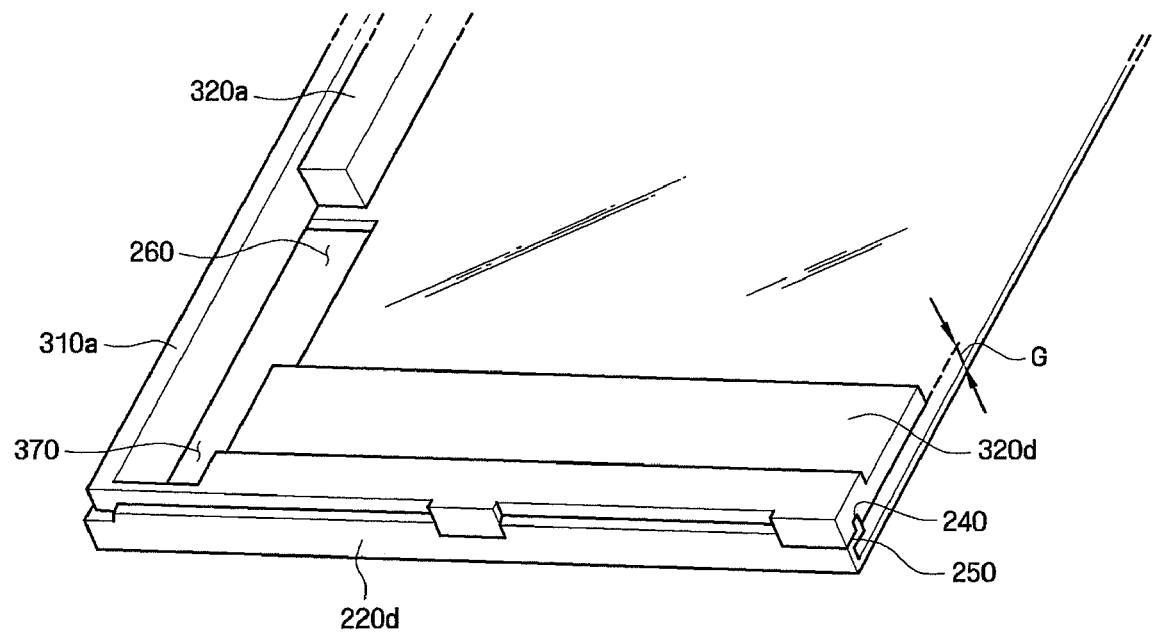
FIGS. 25 through 28 are perspective views sequentially showing a method of assembling an LCD device according to an embodiment of the present invention.

Referring first to FIGS. 1 and 25, the bottom receiving container 200 including the bottom plate 210 is provided. The bottom receiving container also includes sidewalls 220a, 220b, 220c and 220d formed along the boundary of the bottom plate 210, the recessed sidewall portions 240 formed such that portions of one or more of the bottom receiving container sidewalls 220a, 220b, 220c and 220d are recessed toward the inside of the bottom receiving container 200, and the slot 250 formed between the recessed portion 240 and the corresponding sidewall 220a, 220b, 220c and/or 220d. The bottom receiving container 200 may be made of a metallic material having rigidity, and the aforementioned configuration of the bottom receiving container 200 can be obtained by bending the container 200.

Next, a molding material for forming the intermediate receiving container 300 is outsert-injected into the bottom receiving container 200, thereby forming the intermediate receiving container 300 securely combined with the bottom receiving container 200.

The intermediate receiving container 300 includes a frame comprising sidewalls 310a, 310b, 310c, 310d, and securing portions 320a, 320b, 320c, and 320d formed along the bottom receiving container sidewalls 220a, 220b, 220c and 220d to be placed within the receiving space. Intermediate receiving container fitting portions 330 and 340 extend from the intermediate receiving container frame toward the outside of the receiving container and are fittingly coupled to the bottom receiving container 200.

The securing platform 320d and the bottom plate 210 of the bottom receiving container 200 are spaced apart from each other by a predetermined gap G.

Figure 26:
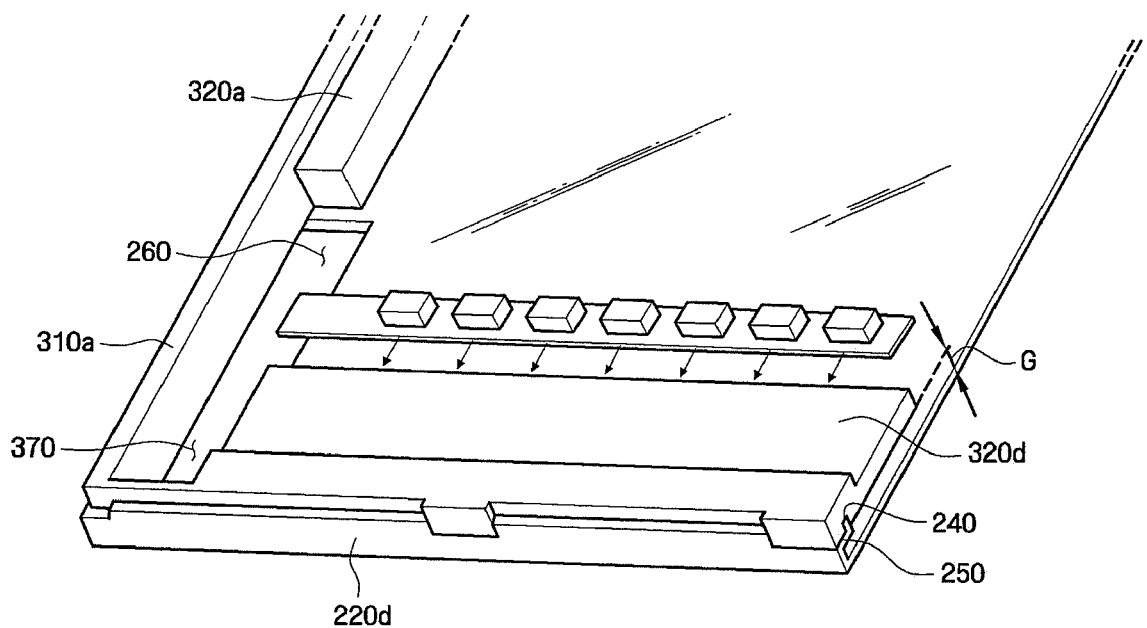

Next, referring to FIG. 26, the light source unit 420 and the FPCB 410 having the light source unit 420 mounted thereon are disposed in the gap G.

Figure 27:
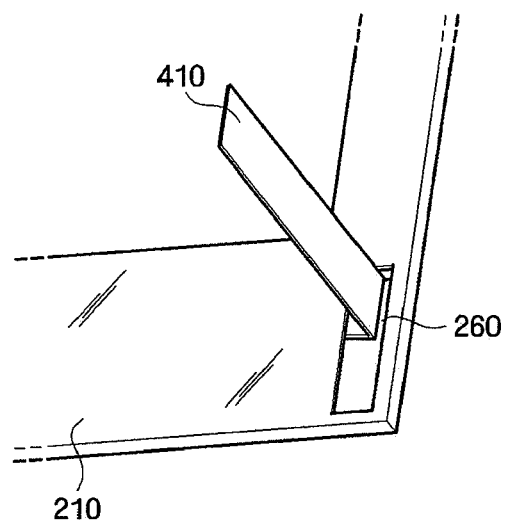

Referring to FIG. 27, the FPCB 410 is led to a rear/bottom surface side of the bottom receiving container 200 through the first leading groove 260 and a second leading groove 370.

Figure 28:
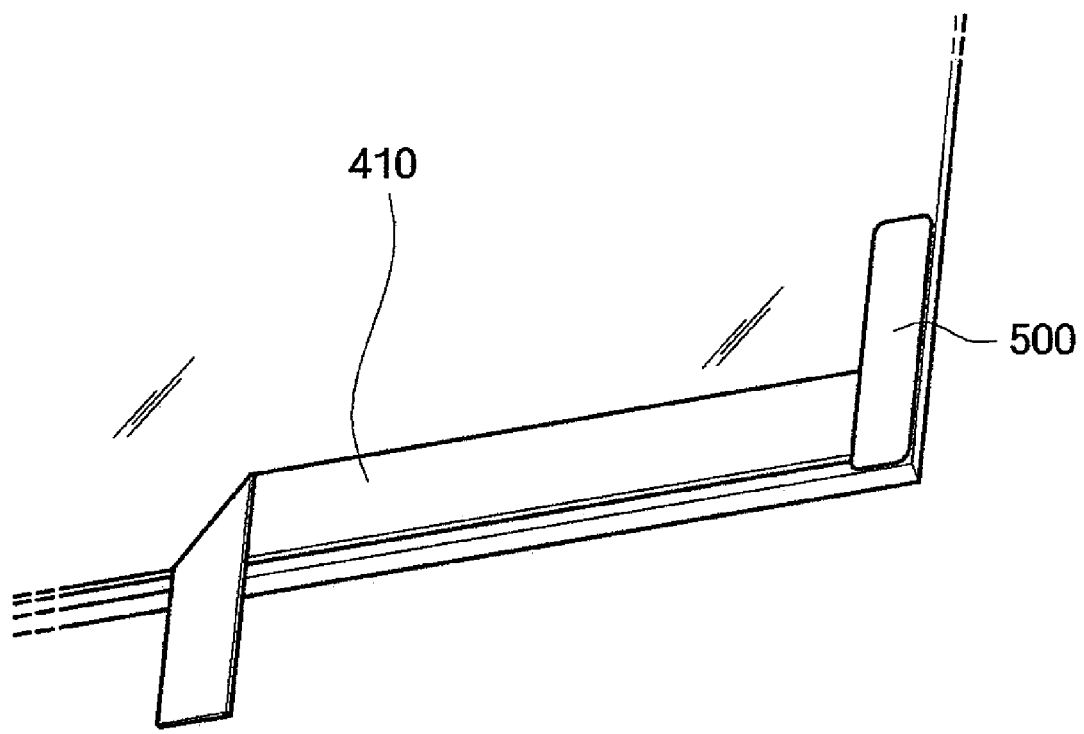

Referring to FIG. 28, the FPCB 410 is closely fixed the rear/bottom surface of the bottom receiving container 200 and then connected to the inverter. An adhesive member 500 such as an adhesive tape is used to closely fix the FPCB 410 at the first leading groove 260.

Referring to FIG. 1, a double-sided adhesive tape is used to attach the reflective sheet 120 to the bottom plate 210. The LGF 110 is placed above the reflective sheet 120 so that one side of the LGF 110 is pressed by the folded fixing portion 230 to fix the LGF 110. Next, the optical sheet 130 and the liquid crystal panel assembly are disposed on securing platforms 320a, 320b, 320c, and 320d of the intermediate receiving container 300.

While the LCD device according to the embodiment of the present invention shown in FIG. 1 has been described by way of example, the assembling method of this embodiment can also be applied to LCD devices according to other embodiments described herein and below.

Referring to FIG. 10, the LCD device, according to an embodiment of the present invention, includes the bottom receiving container 201 including the bottom plate 210, the bottom receiving container sidewalls 220a, 220b, 220c and 220d formed along the boundary of the bottom plate 210, the sidewall extending portion 241 spaced apart from bottom plate 210 while overlapping the bottom receiving container sidewalls 220a, 220b, 220c and 220d, and the slot 251 formed in a gap between the sidewall extending portion 241 and the bottom plate 210. Providing the bottom receiving container 201 includes bending the sidewall extending portion 241 from the upper portions of the bottom receiving container sidewalls 220a, 220b, 220c and 220d toward a side of the bottom plate 210 so as to overlap the bottom receiving container sidewalls 220a, 220b, 220c and 220d by hemming.

In the intermediate receiving container 301 including the intermediate receiving container sidewalls 310a, 310b, 310c, and 310d corresponding to the bottom receiving container sidewalls 220a, 220b, 220c and 220d, and the protrusion(s) 331, a molding material for forming the intermediate receiving container 301 is outsert-injected into the bottom receiving container 201, so that the protrusion(s) 331 protruding from the intermediate receiving container sidewalls 310a, 310b, 310c, and 310d is fitted into the slot(s) 251.

Referring to FIGS. 13 and 17, assembling methods of LCD devices according to embodiments of the present invention include providing bottom receiving containers 202 and 203 each including a bottom plate 210, bottom receiving container sidewalls 220a, 220b, 220c and 220d formed along the boundary of the bottom plate 210, and throughholes 252 and 253 formed in at least one of the bottom receiving container sidewalls 220a, 220b, 220c and 220d and the bottom plate 210.

In the intermediate receiving containers 302 and 303 respectively including the intermediate receiving container sidewalls 310a, 310b, 310c, and 310d corresponding to the bottom receiving container sidewalls 220a, 220b, 220c and 220d, and protrusions 332 and 333 protruding from the intermediate receiving containers 302 and 303, a molding material for forming the intermediate receiving containers 302 and 303 is outsert-injected into the bottom receiving containers 202 and 203, so that the protrusions 332 and 333 protruding from the intermediate receiving container sidewalls 310a, 310b, 310c, and 310d are fittingly inserted into the throughholes 252 and 253.

Referring to FIG. 21, after providing the bottom receiving container 204, as described referring to FIG. 1, the protrusion(s) 334 protrudes from the bottom surface of the securing platforms 320a, 320b, 320c, and 320d and the intermediate receiving container sidewalls 310a, 310b, 310c, and 310d, and is tightly fitted into the throughhole(s) 254, and the protrusion 334 and the intermediate receiving container sidewalls 310a, 310b, 310c, and 310d are subjected to outsert injecting so as to grip the recessed sidewall portion 244.

Figure 29:
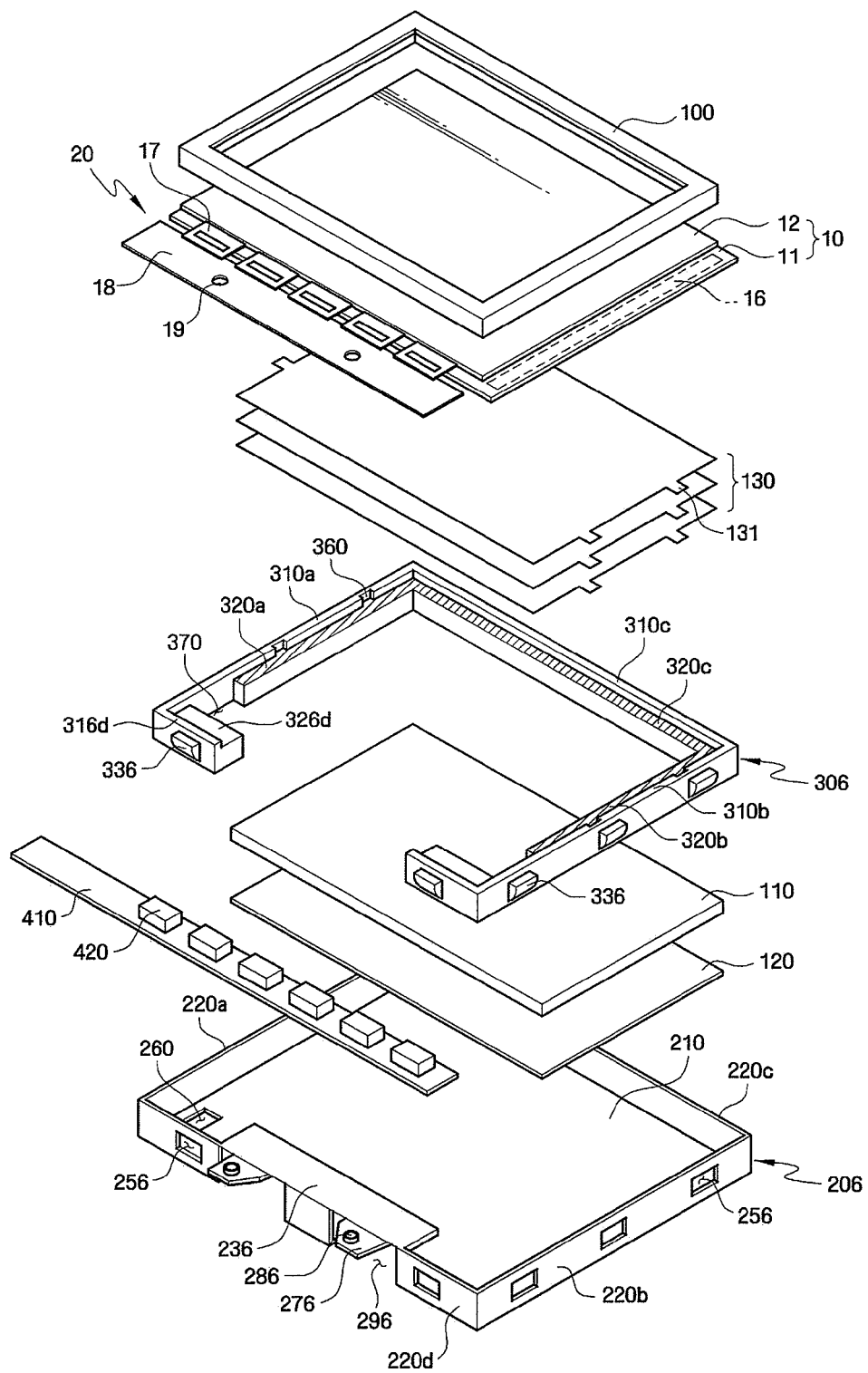
FIG. 29 is an exploded perspective view of a liquid crystal display (LCD) device according to an embodiment of the present invention.
Figure 32:
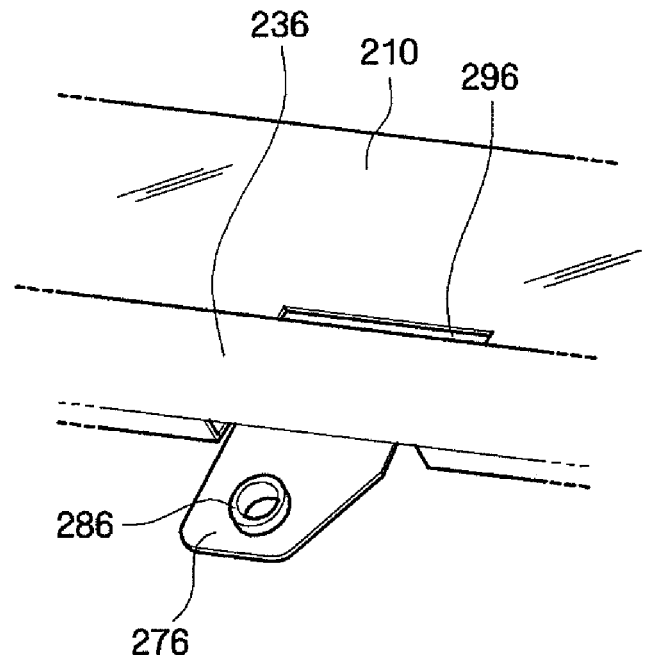
FIG. 32 is a perspective view partially illustrating a positional relationship between a supporting portion of a printed circuit board (PCB) and a folded fixing portion included in the LCD device shown in FIG. 29.
Figure 33:
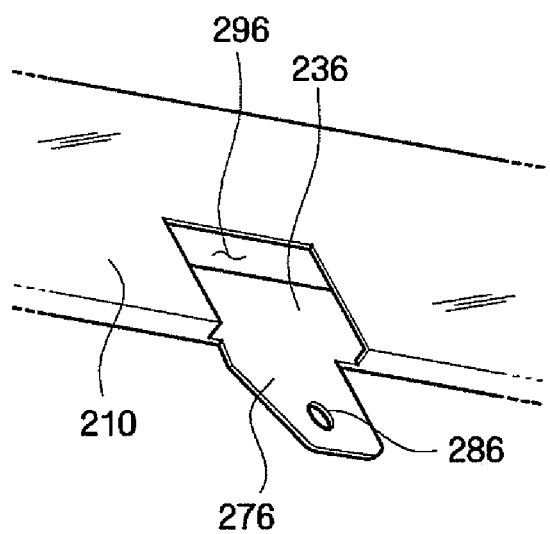
FIG. 33 is a perspective view, as viewed from the bottom, illustrating a positional relationship between the PCB supporting portion and the folded fixing portion included in the LCD device shown in FIG. 29.
Figure 34:
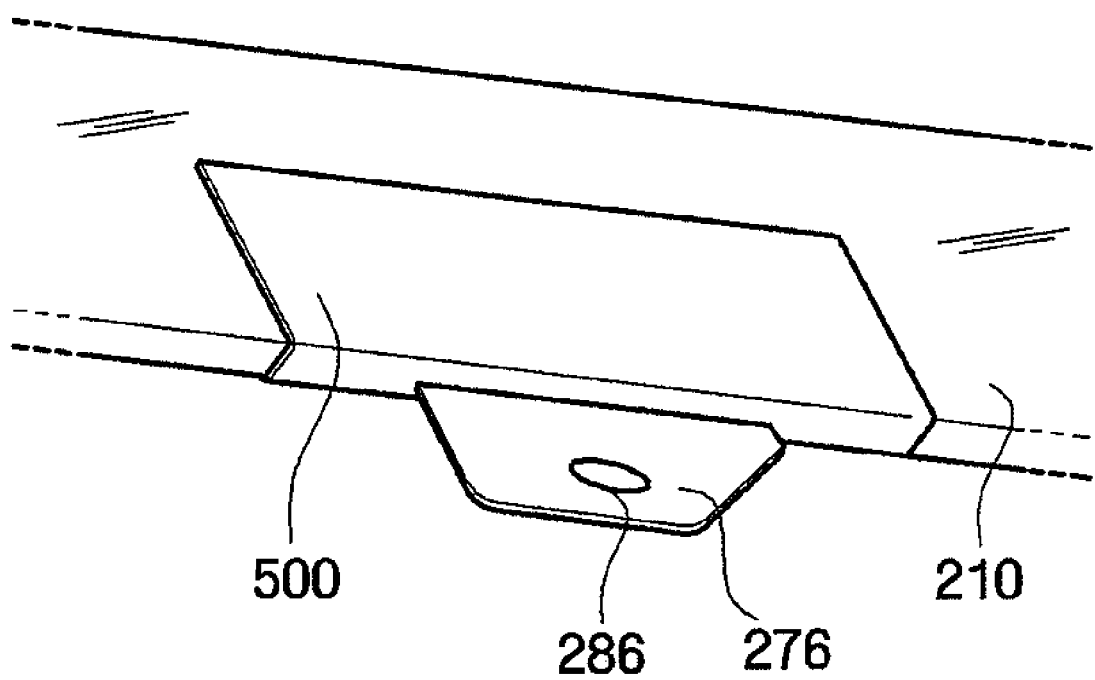
FIG. 34 is a bottom perspective view illustrating a positional relationship between a shielding portion and the bottom receiving container included in the LCD device shown in FIG. 29.

A liquid crystal display (LCD) device according to an embodiment of the present invention will be described in detail with reference to FIGS. 29 through 34. FIG. 29 is an exploded perspective view of a liquid crystal display (LCD) device according to an embodiment of the present invention, FIG. 30 is a perspective view partially illustrating a coupling relationship between a bottom receiving container and an intermediate receiving container included in the LCD device shown in FIG. 29, FIG. 31 is a perspective view illustrating a coupling relationship between a printed circuit board (PCB) for driving a liquid crystal panel and a bottom receiving container included in the LCD device shown in FIG. 29, FIG. 32 is a perspective view partially illustrating a positional relationship between a supporting portion of a printed circuit board (PCB) for driving a liquid crystal panel and a folded fixing portion included in the LCD device shown in FIG. 29, FIG. 33 is a perspective view, as viewed from the bottom, illustrating a positional relationship between the PCB supporting portion and the folded fixing portion included in the LCD device shown in FIG. 29, and FIG. 34 is a bottom perspective view illustrating a positional relationship between a shielding portion and the bottom receiving container included in the LCD device shown in FIG. 29.

Referring to FIG. 29, in order to securely engage the bottom receiving container 206 and the intermediate receiving container 306 with each other, the folded fixing portion 236 extends longer along the bottom receiving container sidewall 220d than folded fixing portions according to other embodiments. As a length of the folded fixing portion 236 is increased, lengths of the intermediate receiving container sidewall 316d and the securing platform 326d are reduced. In a slip-type LCD device, the intermediate receiving container sidewalls 310a, 310b, 310c, 316d and the securing platforms 320a, 320b, 320c, 326d of the intermediate receiving container 306 are thin, for example, about 0.6 mm in thickness. Thus, a light leakage phenomenon may occur due to warping of the intermediate receiving container 306. Accordingly, the bottom receiving container 206 and the intermediate receiving container 306 can be securely engaged with each other and light leakage can be suppressed by increasing a length of the folded fixing portion 236.

Figure 30:
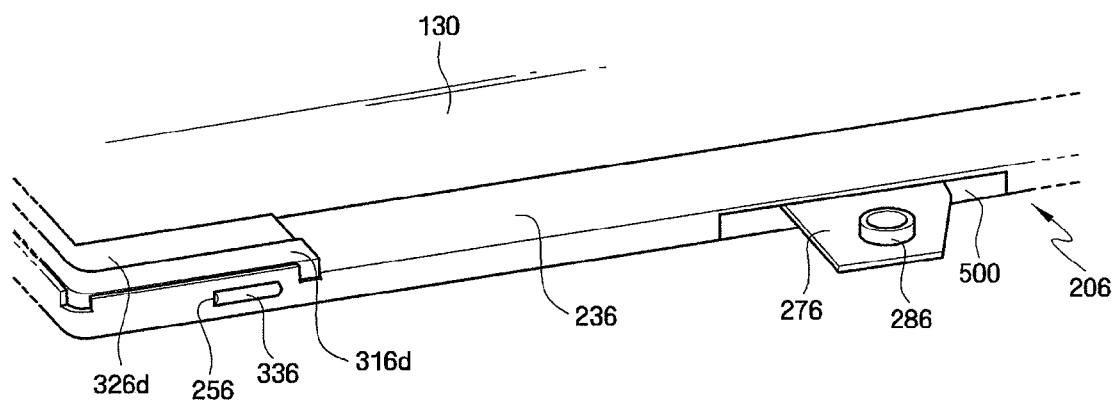
FIG. 30 is a perspective view partially illustrating a coupling relationship between a bottom receiving container and an intermediate receiving container included in the LCD device shown in FIG. 29.

Referring to FIGS. 29 and 30, the bottom receiving container 206 may be combined with the intermediate receiving container 306 by hook coupling. To this end, the intermediate receiving container 306 may include one or more hooks 336, and the bottom receiving container 206 may include one or more hook insertion grooves 256. According to this embodiment, the hook 336 and the hook insertion groove 256 are engaged with each other in the bottom receiving container sidewalls 220a, 220b, 220c and 220d. The bottom receiving container 206 according to this embodiment includes support plates 276 for supporting and fixing the PCB 18, and fixing protrusions 286 formed on the support plates 276. The support plates 276 and the folded fixing portion 236 may be formed on at least one of the bottom receiving container sidewalls 220a, 220b, 220c and 220d.

Figure 31:
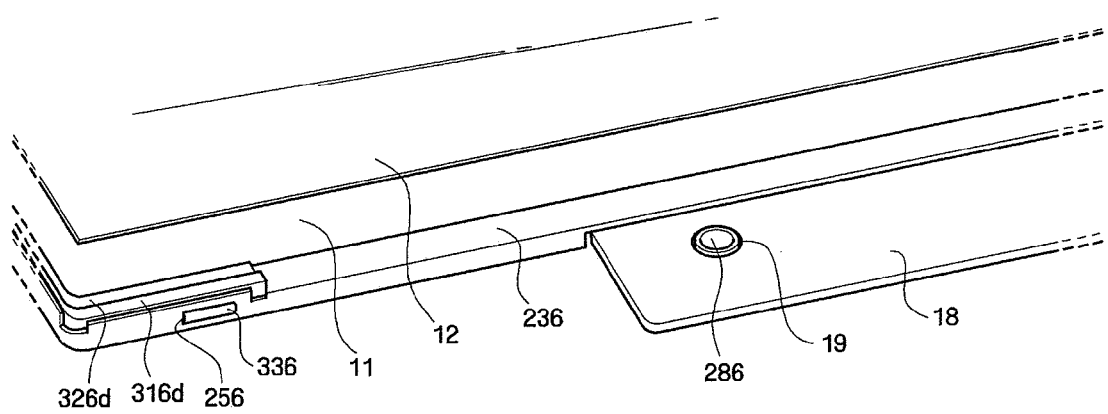
FIG. 31 is a perspective view illustrating a coupling relationship between a printed circuit board (PCB) and a bottom receiving container included in the LCD device shown in FIG. 29.

Referring to FIGS. 29 and 31, the PCB 18 has fixing grooves 19 fitted into the fixing protrusions 286.

Referring to FIGS. 29, 32 and 33, the support plates 276 according to this embodiment may include a cutting portion 296 formed by cutting at least one of the bottom receiving container sidewalls 220a, 220b, 220c and 220d or the bottom plate 210. In other words, since the folded fixing portion 236 is not cut when forming the support plates 276, light leakage can be suppressed, and the bottom receiving container 206 and the intermediate receiving container 306 can be securely engaged with each other.

Referring to FIGS. 29 and 34, in order to prevent light leakage from occurring through the cutting portion 296, the cutting portion 296 is blocked using a shield film 500. The shield film 500 may be, for example, a black film.

The LCD device according to the illustrated embodiment may be assembled in the same or similar manner to those according to the other embodiments.

Figure 35:
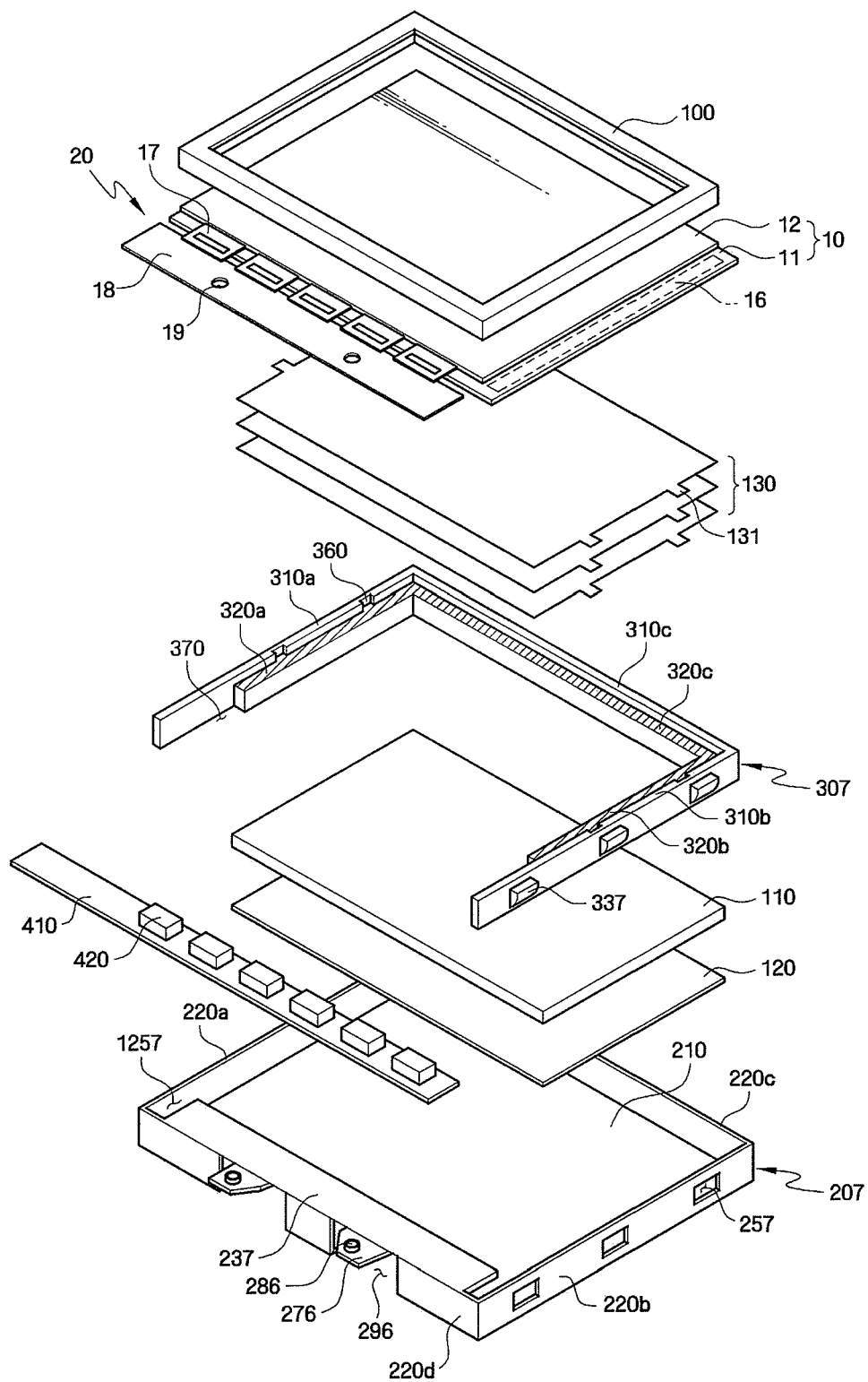
FIG. 35 is an exploded perspective view of a liquid crystal display (LCD) device according to an embodiment of the present invention.

A liquid crystal display (LCD) device according to an embodiment of the present invention will be described with reference to FIGS. 35 through 37. FIG. 35 is an exploded perspective view of a liquid crystal display (LCD) device according to an embodiment of the present invention, FIG. 36 is a perspective view partially illustrating a coupling relationship between a bottom receiving container and an intermediate receiving container included in the LCD device shown in FIG. 35, and FIG. 37 is a perspective view partially illustrating a positional relationship between a supporting portion of a printed circuit board (PCB) for driving a liquid crystal panel and a folded fixing portion included in the LCD device shown in FIG. 35.

Figure 36:
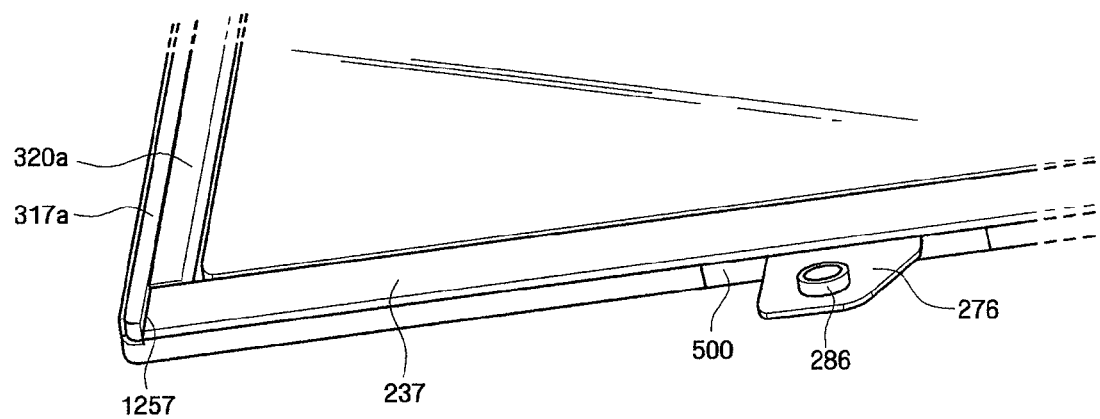
FIG. 36 is a perspective view partially illustrating a coupling relationship between a bottom receiving container and an intermediate receiving container included in the LCD device shown in FIG. 35.
Figure 37:
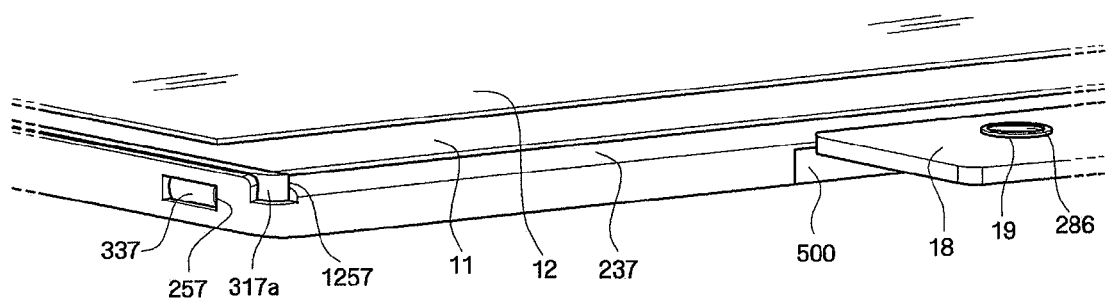
FIG. 37 is a perspective view partially illustrating a positional relationship between a supporting portion of a printed circuit board (PCB) for driving a liquid crystal panel and a folded fixing portion included in the LCD device shown in FIG. 35.

Referring to FIGS. 35 through 37, the folded fixing portion 237 of the bottom receiving container 206 according to this embodiment may be formed over the entire or substantially the entire bottom receiving container sidewall 220d. An insertion groove 1257 is formed between the folded fixing portion 237 and the bottom receiving container sidewall 220a, 220b adjacent to the folded fixing portion 237. The intermediate receiving container 307 can be further securely fixed by the insertion groove 1257. As a length of the folded fixing portion 237 is increased, light leakage can be effectively suppressed.

According to this embodiment, one or more hooks 337 and hook insertion grooves 257 are engaged with each other in the bottom receiving container sidewalls 220a, 220b, 220c, excluding the bottom receiving container sidewall 220d where the folded fixing portion 237 is formed.

The LCD device according to the illustrated embodiment can be assembled in the same or similar manner as shown in the other embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display (LCD) device comprising:
a light guide film;
a light source disposed on at least one side of the light guide film;
a bottom receiving container including a bottom plate to receive the light source and the light guide film, bottom receiving container sidewalls formed along the boundary of the bottom plate to define a receiving space together with the bottom plate;

an intermediate receiving container including a frame formed along the bottom receiving container sidewalls, and fitting portions extending from the frame toward the outside of the receiving space, wherein the fitting portions are fittingly coupled to the bottom receiving container, and the intermediate receiving container is positioned in the receiving space, wherein the frame of the intermediate receiving container includes a plurality of intermediate receiving container sidewalls positioned along inside surfaces of corresponding bottom receiving container sidewalls; and a slot formed in the bottom receiving container to receive an intermediate receiving container fitting portion, wherein the top portion of the slot is open.

2. The LCD device of claim 1, further comprising:
a flexible printed circuit board (FBCB);
a first leading groove in the bottom plate of the bottom receiving container, wherein the FBCB passes through the first leading groove to outside of the receiving space; and
a second leading groove in the bottom plate of the bottom receiving container.

3. The LCD device of claim 1, further comprising:
at least one recessed sidewall portion formed in a portion of a sidewall of the bottom receiving container, wherein the portion of the sidewall is recessed toward the inside of the bottom receiving container, and
wherein the slot is formed between the recessed sidewall portion and the bottom receiving container sidewall, and wherein the intermediate receiving container fitting portion is fitted into the slot.

4. The LCD device of claim 3, wherein the intermediate receiving container fitting portions each include a protrusion protruding from an intermediate receiving container sidewall and fitted into the slot, and an insertion groove formed in the protrusion or the intermediate receiving container sidewall, wherein the insertion groove engages a recessed sidewall portion.

5. The LCD device of claim 4, wherein a bottom of the slot is closed.

6. The LCD device of claim 5, wherein the protrusion closely contacts a bottom surface of the slot and the recessed sidewall portion.

7. The LCD device of claim 4, wherein the bottom receiving container further includes at least one throughhole integrally formed in the bottom plate and a bottom receiving container sidewall, wherein a lower portion of the slot is opened by the throughhole.

8. The LCD device of claim 7, wherein the protrusion protrudes from the frame of the intermediate receiving container and is fitted into the throughhole, and the recessed sidewall portion is gripped by the protrusion and the frame of the intermediate receiving container.

9. The LCD device of claim 1, wherein the frame of the intermediate receiving container includes a plurality of intermediate receiving container sidewalls corresponding to the bottom receiving container sidewalls, and securing platforms protruding toward the inside of the receiving space, and the LCD device further comprises an optical sheet positioned on the securing platforms.

10. The LCD device of claim 9, wherein the intermediate receiving container further includes stoppers formed on the bottom surface of the securing platforms.

11. The LCD device of claim 9, wherein the optical sheet comprises a sheet protrusion extending from at least one side thereof, the intermediate receiving container further comprises a sheet fixing groove formed in at least one of the intermediate receiving container sidewalls, and the sheet protrusion is inserted into the sheet fixing groove.

12. The LCD device of claim 9, wherein the bottom receiving container further comprises a folded fixing portion folded from at least one of the bottom receiving container sidewalls, and at least one of the intermediate receiving container sidewalls is cut at a position corresponding to the folded fixing portion, wherein ends of the cut intermediate receiving container sidewall are opposed with respect to the folded fixing portion.

13. The LCD device of claim 12, wherein securing platforms protrude from the opposed intermediate receiving container sidewalls toward the inside of the intermediate receiving container and are spaced apart from bottom plate to form a gap between the bottom plate and the securing platforms, and the light source and the light guide film are positioned in the gap.

14. The LCD device of claim 1, wherein the bottom receiving container further comprises a throughhole formed in at least one of a bottom receiving container sidewall or the bottom plate, and an intermediate receiving container fitting portion is inserted into the throughhole.

15. The LCD device of claim 14, wherein the intermediate receiving container frame includes intermediate receiving container sidewalls corresponding to the bottom receiving container sidewalls, and securing platforms protruding from the intermediate receiving container sidewalls toward the inside of the intermediate receiving container, and the intermediate receiving container fitting portions each include a protrusion protruding from the intermediate receiving container frame to contact the throughhole.

16. The LCD device of claim 15, wherein the throughhole is formed in the bottom plate of the bottom receiving container, and the protrusion protrudes from the bottom surface of a securing platform and is inserted into the throughhole.

17. The LCD device of claim 15, wherein the throughhole is integrally formed with the bottom plate and the bottom surface of the bottom receiving container sidewall, and the protrusion protrudes from the bottom surface of a securing platform and from an intermediate receiving container sidewall and is inserted into the throughhole.

* * * * *